US 10,241,915 B2

United States Patent
Zoellin et al.

(10) Patent No.: US 10,241,915 B2
(45) Date of Patent: *Mar. 26, 2019

(54) REDUCING CACHE TRANSFER OVERHEAD IN A SYSTEM

(71) Applicant: International Business Machines Corporation, Armonk, NY (US)

(72) Inventors: Christian Zoellin, Weinstadt (DE); Christian Jacobi, West Park, NY (US); Chung-Lung K. Shum, Wappingers Falls, NY (US); Martin Recktenwald, Schoenaich (DE); Anthony Saporito, Highland, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,497

(22) Filed: Dec. 6, 2017

(65) Prior Publication Data

US 2018/0365151 A1 Dec. 20, 2018

Related U.S. Application Data

(63) Continuation of application No. 15/625,097, filed on Jun. 16, 2017.

(51) Int. Cl.
*G06F 12/00* (2006.01)
*G06F 12/0817* (2016.01)
*G06F 12/0842* (2016.01)
*G06F 12/0831* (2016.01)

(52) U.S. Cl.
CPC ...... *G06F 12/0828* (2013.01); *G06F 12/0822* (2013.01); *G06F 12/0833* (2013.01); *G06F 12/0842* (2013.01)

(58) Field of Classification Search
CPC ............. G06F 12/0831; G06F 12/0815; G06F 9/30047; G06F 9/3877; G06F 11/1435;
(Continued)

(56) References Cited

U.S. PATENT DOCUMENTS

| 5,016,167 A | 5/1991 | Nguyen et al. |
| 7,861,055 B2 | 12/2010 | Pong |

(Continued)

FOREIGN PATENT DOCUMENTS

| CN | 101149706 B | 4/2011 |
| CN | 104679669 A | 6/2015 |
| JP | 2010128664 A | 6/2010 |

OTHER PUBLICATIONS

Gracioli et al., "On the Influence of Shared Memory Contention in Real-time Multicore Applications", 2014 Brazilian Symposium on Computing Systems Engineering (SBESC), Nov. 2014, 6 pages.
(Continued)

*Primary Examiner* — Hashem Farrokh
(74) *Attorney, Agent, or Firm* — Nathan M. Rau

(57) ABSTRACT

A method and a system detects a cache line as a potential or confirmed hot cache line based on receiving an intervention of a processor associated with a fetch of the cache line. The method and system include suppressing an action of operations associated with the hot cache line. A related method and system detect an intervention and, in response, communicates an intervention notification to another processor. An alternative method and system detect a hot data object associated with an intervention event of an application. The method and system can suppress actions of operations associated with the hot data object. An alternative method and system can detect and communicate an intervention associated with a data object.

25 Claims, 11 Drawing Sheets

(58) Field of Classification Search
CPC ............... G06F 11/1464; G06F 13/128; G06F 2201/80; G06F 12/0822; G06F 12/0828; G06F 12/0833; G06F 12/0842
See application file for complete search history.

(56) References Cited

U.S. PATENT DOCUMENTS

| | | | |
|---|---|---|---|
| 9,311,142 B2 | 4/2016 | Yamashita et al. | |
| 9,513,959 B2 | 12/2016 | Biles et al. | |
| 2003/0154350 A1 | 8/2003 | Edirisooriya et al. | |
| 2004/0122966 A1* | 6/2004 | Hum | G06F 12/0826 709/232 |
| 2004/0230751 A1 | 11/2004 | Blake et al. | |
| 2012/0317362 A1* | 12/2012 | Hendry | G06F 12/0831 711/130 |
| 2013/0205099 A1* | 8/2013 | Guthrie | G06F 12/0831 711/146 |
| 2016/0248695 A1 | 8/2016 | Marlan et al. | |

OTHER PUBLICATIONS

Yun et al., "Memory Access Control in Multiprocessor for Real-time Systems with Mixed Criticality", 2012 24th Euromicro Conference on Real-Time Systems (ECRTS), Pisa, Italy, Jul. 2012, 10 pages.

Papamarcos et al., "A Low-Overhead Coherence Solution for Multiprocessors with Private Cache Memories", ACM SIGARCH Computer Architecture News 12.3 (1984). pp. 348-354.

Zhao et al., "Dynamic Cache Contention Detection in Multi-threaded Applications", VEE '11: Proceedings of the 7th ACM SIGPLAN/SIGOPS International Conference on Virtual Execution Environments, ACM SIGPLAN Notices—VEE 11, vol. 46, Issue 7, ACM, 2011, 11 pages.

Bloom, "Space/Time Trade-offs in Hash Coding with Allowable Errors", Communications of the ACM, vol. 13, No. 7, Jul. 1970, pp. 422-426.

Zoellin et al., "Reducing Cache Transfer Overhead in a System," U.S. Appl. No. 15/625,097, filed Jun. 16, 2017.

Zoellin et al., "Reducing Cache Transfer Overhead in a System," U.S. Appl. No. 15/833,444, filed Dec. 6, 2017.

List of IBM Patents or Patent Applications Treated as Related, Signed Dec. 6, 2017, 2 pages.

International Search Report and Written Opinion dated Oct. 17, 2018 for Application PCT/IB2018/054358.

* cited by examiner

REDUCING CACHE TRANSFER OVERHEAD IN A SYSTEM

BACKGROUND

The present disclosure relates to computing systems that employ caches. More particularly, the present disclosure relates to managing shared data, in a computing system, that can be stored in caches. The disclosure relates to data that can be cache lines of a memory, or alternative forms of data, such as data objects in a distributed computing system.

Processors in a computing system can employ local caches such as, for example, to improve access latency to instructions, and/or data, used by a processor (e.g., in executing instructions). However, a plurality of processors sharing data can lead to contention for that data among the processors. The contention can cause an increase in the frequency of transferring data between caches in various processors, particularly if one processor modifies a cache line shared by other processors, creating an incoherent data problem for the caches of the other processors and requiring the other processors to fetch a copy of the modified cache line. Increasing the frequency of transferring data, such as cache lines, can limit or reduce progress of a program, and/or increase the relative time spent transferring data, as opposed to using the data. Transferring cache lines between processors has an associated overhead (e.g., transfer latency, bus or inter-processor link utilization, etc.). A high, or increased, frequency of transferring data between processors correspondingly increases the associated overhead. The overhead can limit, or reduce, performance of processors and/or the overall computing system.

"A Low-Overhead Coherence Solution for Multiprocessors with Private Cache Memories", by Mark S. Papamarcos and Janak H. Patel (hereinafter, "Papamarcos"), published Jan. 1, 1984 by the Institute of Electrical and Electronic Engineers (IEEE), describes effects of transferring cache lines between local caches of processors in a multiprocessor system. For example, Papamarcos describes a design for cache memory in multiprocessor systems comprising a "private cache for each processor, as shown in FIG. 1" and that "this organization suffers from the well known data consistency, or cache coherence problem." Papamarcos further states: "the simplest way to solve the coherence problem is to require that the address of the block being written in cache be transmitted throughout the system" but that "Obviously, the invalidate traffic grows very quickly". Papamarcos describes a solution to reduce cache invalidation requests: "All unnecessary invalidate requests can be cut off at the point of origin. Bus traffic is therefore reduced to cache misses."

While Papamarcos addresses overhead due to bus traffic associated with invalidation requests, a solution is still needed to address increased overhead associated with transferring cache lines subject to contention between contending processors, and particularly transferring cache lines subject to contention and associated with cache line misses.

Similar to processors sharing data, such as cache lines, applications executing in a computing system can employ caches, such as to improve access latency to a data object (e.g., a file, or a portion of an Internet page) used by the applications. However, shared data in a computing system can be subject to contention among the applications sharing that data, particularly if one application modifies the shared data and causes an incoherent data problem in the copies of the data held in the caches of other applications. The contention can cause an increase in the frequency of transferring data objects between various application caches, which can in turn increase overhead (e.g., transfer latency, network utilization, etc.) associated with caching data in the computing system. In a manner similar to processors sharing data, increased frequency of transferring data objects between applications can have a corresponding increase in overhead, which can in turn limit, or reduce, performance of the applications and/or the overall computing system.

SUMMARY

Overhead associated with transferring shared data in a cache (e.g., caching processor instruction operand data in memory cache lines shared by processors in a computing system, and/or caching data objects shared by applications of a computing system) can limit or reduce processor, application, and/or computing system performance. Accordingly, there is a need for methods and/or systems that can avoid or reduce overhead associated with transferring cached data in a computing system. Embodiments of the present disclosure can achieve such objectives.

According to embodiments of the present disclosure, a method for managing cache contention comprises receiving an intervention notification associated with a first request to obtain a first copy of a cache line. Based on the intervention notification, the method includes recording, in association with the cache line, a first status indicating that the cache line is a potential hot cache line. The method further includes suppressing, based on the recorded first status indicating the cache line is a potential hot cache line, an action associated with performing an operation associated with the cache line.

The method can further comprise receiving a second fetch request, to obtain a second copy of the cache line, and recording, in association with the cache line, in response to the second fetch request and based on the recorded first status indicating that the cache line is a potential hot cache line, a second status indicating that the cache line is a confirmed hot cache line. The method can include suppressing, based on the recorded second status indicating the cache line is a confirmed hot cache line, an action associated with performing an operation associated with the cache line.

In some embodiments, the first fetch request is associated with a first processor, among a plurality of processors using the cache line. The intervention notification is further associated with a second processor, among the plurality of processors using the cache line, having the first copy of the cache line. In such embodiments, receiving the intervention notification comprises the second processor communicating the intervention notification and the first processor receiving the intervention notification, recording the first and the second status comprises the first processor recording the first and second status; and suppressing the action associated with performing the operation comprises the first processor suppressing the action.

The method optionally includes a hot line table having entries associated with respective cache lines. Each entry of the hot line table includes at least one of a component to record the first status, a component to record the second status, attributes of the respective cache line, and the operation associated with the respective cache line.

According to alternative embodiments of the present disclosure, a system for managing cache contention comprises a first processor, included in a plurality of processors included in a computing system, and a contention suppression circuit. The first processor is configured to receive an intervention notification associated with a first fetch request to fetch a first copy of a cache line and to record a first status, in response to the intervention notification, indicating that the cache line is a potential hot cache line.

According to embodiments of the system, the contention suppression circuit is configured to determine an action, associated with the first processor performing an operation associated with the cache line, and to communicate a suppression indication to the first processor, based on the first status indicating that the cache line is a potential hot cache line. The suppression indication comprises an indication to suppress the action. The first processor is further configured to suppress the action in response to the suppression indication.

In some embodiments, the first processor can be further configured to receive a second fetch request, to fetch a second copy of the cache line, and to record a second status, in response to the second fetch request and based on the first status indicating that the cache line is a potential hot cache line. The second status indicates that the cache line is a confirmed hot cache line. In such embodiments, the compression circuit can be further configured to signal the suppression indication based on the second status indicating that the cache line is a confirmed hot cache line.

In some embodiments, the system further comprises an inter-processor network, in which the inter-processor network is configured to receive the intervention notification from a second processor among the plurality of processors. The inter-processor network is further configured to communicate the intervention notification to the first processor and the first processor is further configured to receive the intervention notification from the inter-processor network. Also in some embodiments, suppressing the action comprises one or more of: suppressing a speculative execution of an instruction, suppressing a fetch of the cache line, suppressing a fetch of the cache line, suppressing use of the cache line, suppressing out-of-order execution of instructions, suppressing issuance of instructions allowing more time to receive a response to a third fetch request to obtain a third copy of the cache line, and retrying an instruction associated with the cache line.

According to yet other embodiments of the present disclosure, a method for indicating memory contention comprises receiving a first request to fetch a cache line and determining, in response to the first request, that a first cache has a first copy of the cache line. The method further comprises determining that a first status of the cache line comprises an exclusive status. Based on the cache line having the exclusive status, the method further includes communicating a notification that the first request caused an intervention associated with the first copy of the cache line.

In other embodiments of the present disclosure, a system for indicating cache contention comprises a first processor, among a plurality of processors included in a computing system, and an intervention circuit. The first processor is configured to receive a first request to fetch a first copy of a cache line and, in response to the first request, to identify a first copy of the cache line in a first cache. The first processor is further configured to determine that the cache line has an exclusive line status, and generate an intervention status, based on the exclusive line status and the first copy included in the first cache. The intervention circuit is configured to receive the intervention status from the first processor and, based on the intervention status, to generate a first intervention notification and to communicate, the first intervention notification to a second processor among the plurality of processors.

By determining hot cache lines, based on interventions associated with cache line fetches, and suppressing actions or operations associated with hot cache lines, embodiments of the disclosure can avoid or reduce the frequency of cache line transfers. Avoiding and/or reducing the frequency of cache line transfers can limit or reduce overhead associated with cache line transfers, allowing processor and/or computing systems to achieve higher levels of performance.

Embodiments can include methods and systems for detecting hot data objects used by applications in a computing system. The methods and systems can identify potential hot data objects based on receiving intervention notifications associated with an application of the computing system requesting a copy of a data object. In some embodiments, methods and systems can include receiving a second request for a data object and determining, based on the second request, that the data object is a confirmed hot data object. The methods and systems can suppress actions of operations associated with a data object based on the data object being a potential or confirmed hot data object.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
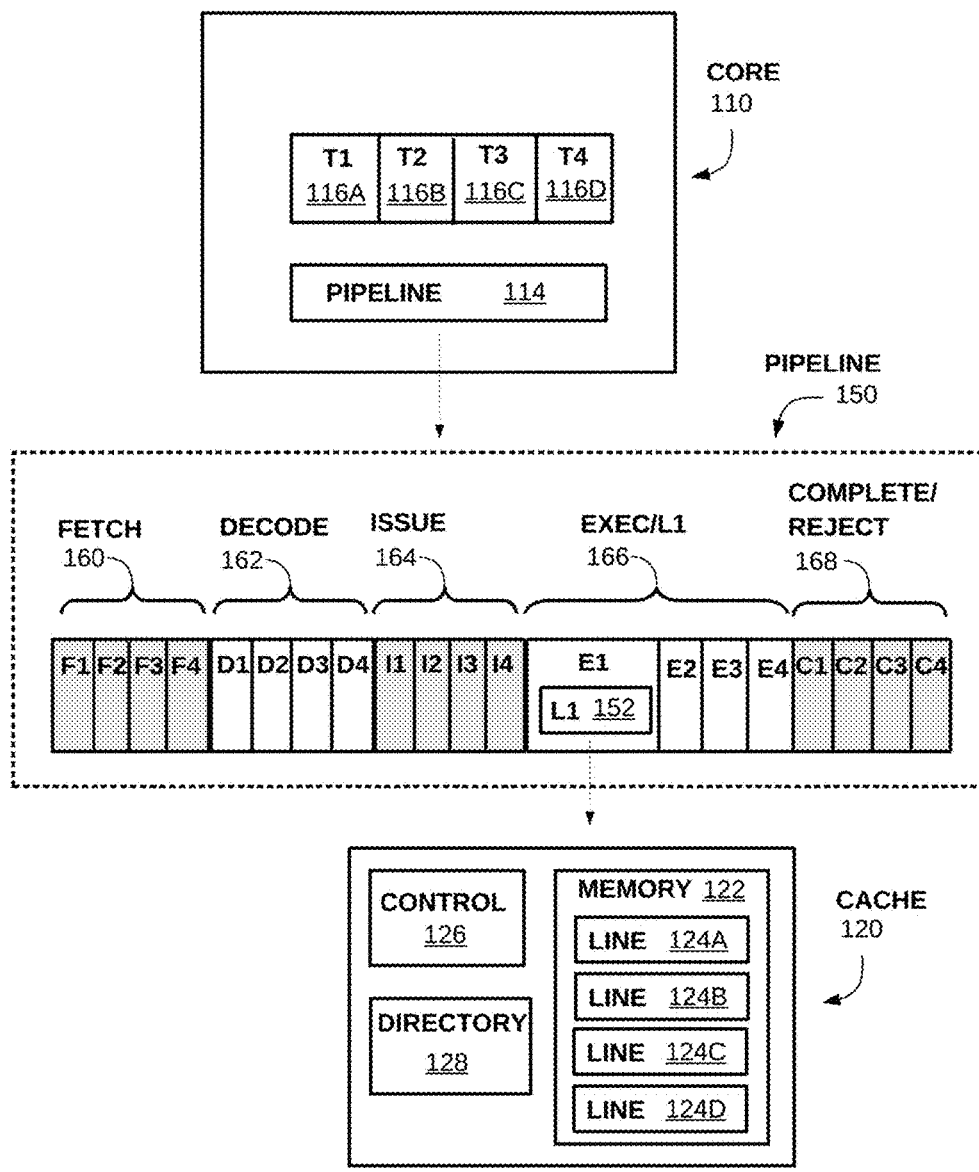
FIG. 1 is a block diagram illustrating an example processor core, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to computing systems. More particular aspects relate to transferring data between caches in a computing system, such as memory cache lines shared by a plurality of processors, and/or data objects shared by a plurality of applications (or, instances of the same application). The disclosure features methods and systems to identify particular data in a computing system as subject to a high degree of contention among the processors and/or applications, or as "hot" cache lines or data objects.

The disclosure further features methods and systems that can, under some circumstances, avoid certain data transfers between, based on the cache lines identified as hot cache lines. Embodiments of the disclosure (hereinafter, "embodiments") can, accordingly, avoid or reduce overhead in a computing system associated with caching data. Avoiding and/or reducing cache-related overhead can be advantageous to performance of processors, applications, and/or a computing system overall.

Cache memories in a computing system can improve processor, application, and/or computing system performance by placing data (e.g., a computer instruction, or an operand of a computer instruction) in a memory that has a lower access latency (time to read or write data in a memory) as compared to other memories, such as a main memory (or, a storage device hosting data in, for example, a distributed computing system). In a computing system, a main memory can store programs and/or data used by programs executed by processors within the system. A storage element in a computing system can store (or, "host") data used by applications within the computing system (e.g., such as in a distributed computing system).

Using the example of processors caching data used by instructions, or data used by a processor otherwise in executing instructions, a cache memory, and/or a combination of cache memories (e.g., a hierarchy of cache memories), can provide processors lower access latency to data in another memory, such as a main or other (higher access latency) memory.

A cache memory can be included in a processor, and/or between a processor and another memory (including, for example, another cache memory and/or a main memory) and can store a copy of data otherwise stored in a main memory. For example, processors can include a local, or "Level 1" (L1), cache, and computing systems can include additional caches, such as "level 2" (L2) and "level 3" (L3) caches, between a processor (or, a local cache of a processor) and another memory (e.g., a main memory).

For purposes of illustrating the disclosure, but also not intended to limit embodiments, "local cache" refers to a cache included in (or, "local to") a particular processor, such as an L1 cache. However, it would be apparent to one of ordinary skill in the art that, in embodiments, a processor can store a copy of data in structures and/or elements other than an L1 cache, within the scope of the disclosure. Additionally, the examples of the disclosure illustrate caches that cache (i.e., store) primarily data used by a processor as operands of instructions. However, this is also not intended to limit embodiments, and it would be appreciated by one of ordinary skill in that art that the scope of the disclosure is not limited to caches that contain instruction operand data, and that the disclosure encompasses embodiments that cache data other than instruction operands, such as, for example, processor instructions and/or data used by various elements of a processor and/or other components of a computing system, an/or data objects used by applications of a computing system.

In embodiments, data can be organized in a cache in "cache line" units of a particular amount of data (e.g., 128 or 256 bytes) associated with a particular location in a memory, such as a main memory. Operands of instructions executed by a processor can be smaller units of data (e.g., 4, 8 or 16 bytes) contained within a cache line of data. Accordingly, having a copy of instruction operand data, in a cache, can include having a copy of a complete cache line (i.e., the data within the cache line) in the cache. As used herein, "cache line" refers interchangeably to a location in a memory, and/or a cache, corresponding to a cache line of data, and data stored within that cache line, as will be clear from the context of the reference.

A processor can determine if a copy of a cache line is included in a local cache, such as when the processor executes an instruction that references a memory location within a particular cache line. If the processor has a copy of the cache line stored ("cached") within a local cache, the processor can use data from within the cached copy of the cache line. If the processor does not have a cached copy of the cache line, the processor can incur a "cache miss". In response to the cache miss, the processor can fetch the cache line from the corresponding memory location, from another cache, and/or from another processor having a valid (e.g., an unmodified or, alternatively, most recently modified) copy of the cache line in a local cache.

In embodiments, a plurality of processors can use (i.e., share) data within the same cache line in a memory. For example, embodiments of a Symmetric Multi-Processing (SMP) computing system can execute programs on a plurality of processors, and different processors can execute programs that access data stored in the same cache line in a main memory, or a cached copy (i.e., a copy of a cache line of data stored in a cache memory) of a cache line.

As used herein, "processor" refers to any form and/or arrangement of a computing device using, or capable of using, data stored in a cache, including, for example, pipelined and/or multi-cycle processors, graphical processing units (GPUs), and/or neural networks. Also, as used herein, "computing system" refers to a computing system that employs processors utilizing data stored in one or more caches. However, this is not intended to limit embodiments, and it would be appreciated by one of ordinary skill in the art that embodiments can employ other varieties and/or architectures of processors within the scope of the disclosure.

In embodiments, more than one processor in a computing system can have a copy of the same cache line in a local cache. For example, embodiments can include shared memory locations, which can be memory locations that are the same, or are included in the same cache line, and used by different programs, or different portions of a particular program, executing on different processors. A plurality of processors can concurrently use data stored in their individual copies of the cache line, such as to read, but not modify, data from that copy (i.e., to use that cache line for read-only purposes). In embodiments, a cache line used commonly by a plurality of processors for read-only purposes (among all processors using that cache line) can have an associated "shared" status, and, while a cache line has the shared status, any of the plurality of processors can have a copy of that cache line in a local cache of the respective processors. Additionally, in embodiments, if no processors having copies of the same cache line modify that cache line, then all copies of the cache line can remain valid while each of the processors use data within that cache line. However, if any processor having a copy of that cache line modifies data within it, all other processors then have invalid (e.g., unmodified) copies of that cache line.

Embodiments can permit a particular processor (referred to herein as a "controlling" processor) to have exclusive rights, or "exclusivity", to a particular cache line potentially used by more than one processor. In embodiments, a processor having exclusivity to a cache line can change the status of the cache line from shared to "exclusive". In some embodiments, while a cache line has exclusive status, a controlling processor can modify, in a local cache, data within that cache line.

In embodiments, a cache line fetch request by another processor for a cache line held in exclusive status by a controlling processor can cause a condition referred to herein as an "intervention". An intervention, in some embodiments, can cause a controlling processor to change, or "demote", the status of a cache line from exclusive to shared (e.g., read/write to read-only), to transfer the cache line to the requesting processor (and, optionally, to another cache or memory), and/or to invalidate the copy of the cache line within a local cache of the controlling processor. "Invalidating" a cache line in a cache can cause a processor to suppress (e.g., delay or discontinue) further use of data included in that cache line, as it exists in a local cache of the processor, and to instead fetch that cache line anew for any operations that use data within it.

Transferring a cache line from one processor to another (and/or to another cache or memory), such as to satisfy a cache line fetch request, can involve overhead in a computing system, which can in turn have a degrading effect on processor and/or overall computing system performance. Cache line transfer overhead (hereinafter, "overhead") can include, for example, increased interconnection utilization (e.g., utilization of buses, inter-processor links, and/or inter-memory links) to transfer the cache line, increased instruction execution latency (awaiting completion of the transfer) for a requesting processor to complete execution of one or more instructions that use the cache line, increased processor and/or cache utilization in one or both of the controlling and requesting processors to manage and perform the transfer. The effect of overhead can increase as the distance (e.g., number of intervening memory elements and/or interconnections, such as buses and links) between the processors increases. The effect of the overhead can increase in certain types of processors, such as pipelined processors.

A cache line that is used frequently (that is, has a high degree of contention), by a plurality of processors, can be said to be a "hot" cache line. In embodiments, detecting a hot cache line, and taking actions to avoid or reduce overhead associated with hot cache lines, can improve performance of processors and/or a computing system. Accordingly, methods and systems of the disclosure detect probable and confirmed hot cache lines and suppress (e.g., delay or discontinue) actions of operations involving those cache lines to avoid or reduce transfers of hot cache lines, and/or to improve processor execution of instructions using or depending on hot cache lines, to avoid or reduce overhead associated with transferring cache lines between processors and thereby improve performance of processors and/or computing systems. Similarly, methods and systems of the disclosure detect probable and confirmed hot data objects in a computing system, and suppress (e.g., delay or discontinue) actions of operations involving those data objects to avoid or reduce transfers of hot data objects, and/or to improve application performance using or depending on hot data objects, to avoid or reduce overhead associated with transferring data objects between application caches and thereby improve performance of computing systems.

While the disclosure is not necessarily limited to such applications, various aspects of the disclosure may be appreciated through a discussion of various examples using this context.

FIG. 1 illustrates an example of a processor core, which can be a processing element of processors according to various embodiments. For purposes of illustrating the example, but not intended to limit embodiments, CORE 110 can be considered to be a pipelined processor in an SMP computing system. CORE 110 comprises instruction PIPELINE 114 and processing threads 116A-116D (collectively, "threads 116"). In embodiments, threads 116 can, for example, each record an execution context (e.g., various states and/or attributes) of a particular sequence of instructions executed by CORE 110.

In embodiments, a processor core can be a component of a processor chip, and the chip can include multiple cores of the same or different type. Embodiments can include one or more processor chips in a processor module. As used herein, in addition to a "processor" including a local cache, "processor" further refers, interchangeably to any of a thread, a core, a chip, a module, and/or any other configuration or combination thereof.

In embodiments, an instruction pipeline, such as PIPELINE 114, can enable a processor, such as CORE 110, to execute multiple instructions, each in various stages of execution, concurrently. To illustrate, PIPELINE 114 can be an instance of an instruction pipeline such as example PIPELINE 150. PIPELINE 150 comprises a plurality of instruction processing units for a processor to execute multiple instructions, or portions of a single instruction, concurrently. FIG. 1 depicts PIPELINE 150 as comprising FETCH unit 160, comprising fetch stages F1-F4; DECODE unit 162, comprising decode stages D1-D4; ISSUE unit 164, comprising issue stages I1-I4; execution unit EXEC/L1 166, comprising execution stages E1-E4; and instruction completion unit, COMPLETE/REJECT 168, comprising completion stages C1-C4.

While example PIPELINE 150 is shown comprising 5 units, each having four stages, this is not intended to limit embodiments. Embodiments can include additional (or, fewer) units, within an execution pipeline, and can contain additional (or, fewer) stages in each unit as compared to the example of FIG. 1 PIPELINE 150. "Deep" pipelines are examples of processor pipelines that can have pipeline units, and/or stages per unit, more than as shown in the example of FIG. 1.

In embodiments, instructions under execution by a core can proceed sequentially through an instruction pipeline, such as 150. FETCH unit 160 can fetch multiple instructions for execution using fetch stages F1-F4. For example, instructions fetched by FETCH unit 160 can proceed to DECODE unit 162, for concurrent decode using decode stages D1-D4. Decoded instructions can be issued for execution via issue stages I1-I4 of ISSUE unit 164. Issued instructions can proceed to execution unit 166, and execution stages E1-E4 can perform particular execution actions of those issued instructions, such as performing Arithmetic Logic Unit (ALU) or other computation unit operations, and/or loading or storing memory operands of the instructions. Completion stages C1-C4 of COMPLETE/REJECT unit 168 can complete, and/or flush or terminate, instructions from other units of PIPELINE 150. In embodiments, a pipelined processor can process a plurality of instructions, or portions of instructions, concurrently by means of the stages of the units comprising an instruction pipeline.

Embodiments can utilize non-pipelined processors (e.g., multi-cycle processors), and these processors can include a local cache. If an operand is not cached in a local cache, the processor can initiate cache miss processing. In such non-pipelined embodiments, cache miss processing can further include stopping or delaying execution of instructions using those operands, and/or instructions that may depend on the results of instructions using those operands.

Alternative embodiments can utilize pipelined processors, such as illustrated in FIG. 1, and a local cache can be a component of a unit within the pipeline, such as a load/store unit of an instruction pipeline. For example, in FIG. 1, local cache L1 152 is shown as a component of execution unit (or, stage) E1 in execution pipe EXEC/L1 166. While not shown, embodiments can include multiple execution and/or other units of an instruction pipeline that can each include local (e.g., L1) caches.

In embodiments, L1 152 can be an instance of a cache such as illustrated by example CACHE 120. CACHE 120 comprises a control unit, CONTROL 126 and MEMORY 122.

MEMORY 122 contains cache lines 124A-124D (collectively, "lines 124"), which can, in embodiments, store copies of cache lines in use by CORE 110. CONTROL 126 can, in embodiments, operate to manage the state and/or content of each of lines 124.

A cache can include a cache directory, illustrated in the example of FIG. 1 as DIRECTORY 128. In embodiments, a cache directory can record the identities (e.g., a memory address, or subset or hash thereof) of cache lines stored in the cache. A cache directory can include other information about cache lines included in a cache, such as most (or, alternatively, least) recent time it was referenced, or a number of times it has been referenced. A cache directory can include a status associated with each of the cache lines stored in the cache. Such status can include, for example, whether the cache line has shared vs. exclusive status, whether the cache line is valid (e.g., contains an unmodified, or most recently modified copy), which processor (e.g., which core within a processor chip if, for example, a local cache is shared by multiple cores), and other attributes of the cache line and/or its usage in the cache.

Execution stage E1, and/or other stages E2-E4 (and/or stages of other units), can determine, when using data in a cache line, whether the operands are stored in a local cache, such as 152. If an execution stage among E1-E4 determines that an operand is not cached in L1 152, the execution stage(s), or other components of CORE 110, can initiate cache miss processing. In embodiments, cache miss processing can further include stopping or delaying execution of instructions (or, portions of instructions) using those operands, and/or instructions that may depend on the results of instructions using those operands.

While FIG. 1 illustrates L1 152 as an example of an instance of CACHE 120, it would be apparent to one of ordinary skill in the art that instances of example CACHE 120, and/or other embodiments of a cache, are not limited to inclusion in a processor core, and that any of a variety of caches in a computing system, included within or external to, CORE 110 can be instance of a cache such as example CACHE 120. Further, while example CACHE 120 illustrates MEMORY 122 comprising four cache line entries, this is not intended to limit embodiments.

In some embodiments, a processor core, such as 110, can execute an instruction, or portions of an instruction, out of order and/or speculatively. Out of order execution can allow a processor to execute portions of an instruction or program as soon as an execution unit (or, a stage of an execution or other unit in a pipeline) is available, rather than delay execution to wait for completion of other portions of an instruction, or other instructions in a program. In this way, a processor can keep most or all of its pipeline units and/or stages busy to improve computing throughput.

Speculative execution can allow a processor to start execution of an instruction, or a portion of an instruction, based on a likelihood that the processor will complete executing that instruction (or, portion thereof). For example, a processor can speculatively execute one or more instructions that follow a particular branch path in a program, prior to executing a conditional test that determines that path, based on a likelihood that the program will take that branch. In this way, a processor can utilize otherwise idle elements (e.g., units and/or stages of a pipeline) and can achieve higher computational throughput, in the event that the results of the speculatively-executed instruction (or portion thereof) can be used as other instructions (or, portions of an instruction) complete execution.

In embodiments, processors, caches, and/or memories can be coupled by an inter-processor network. Embodiments of an inter-processor network can include an SMP network. For purposes of illustrating the examples of the disclosure, but not intended to limit embodiments, "SMP network" refers herein interchangeably to an SMP network and any alternative form of inter-processor network such as would be understood by one of ordinary skill in the art to be suitable for coupling processors, memories, and/or caches in a computing system.

Figure 2:
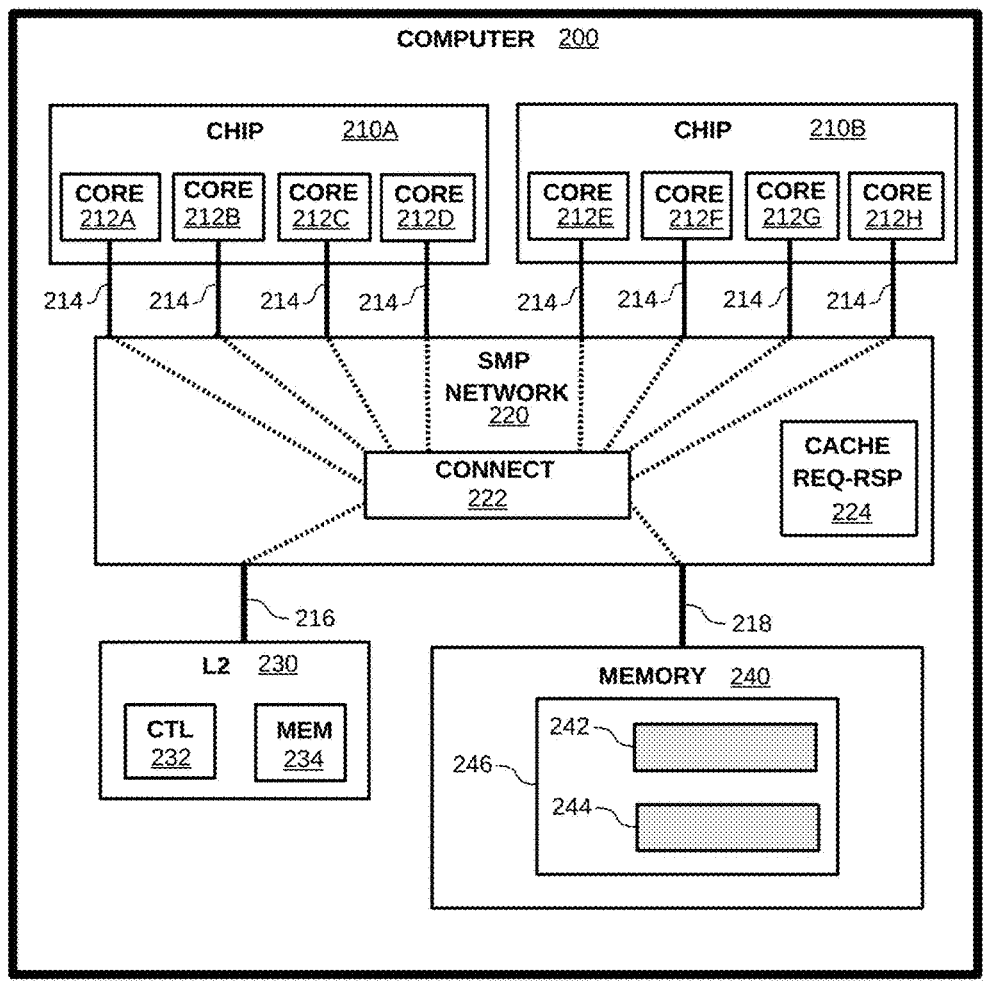
FIG. 2 is a block diagram illustrating an example computer, according to aspects of the disclosure.

FIG. 2 illustrates an example computer having a plurality of processors interconnected to a cache and memory through an inter-processor network. In embodiments, an SMP network can operate to exchange data and/or logic signals (e.g., status indicators, protocol commands and/or responses, etc.) between processors, caches, and/or memories. In some embodiments, an SMP network can be aware of particular memory locations stored in cache lines of various caches and/or processors.

As shown in FIG. 2, computer 200 includes processor CHIP 210A and CHIP 210B (hereinafter, "chips 210"), L2 230, and MEMORY 240 interconnected by SMP NETWORK 220. CHIP 210A and CHIP 210B include processors CORES 212A-212H (hereinafter, "cores 212"). For purposes of illustrating the disclosure, but not intended to limit embodiments, cores 212 are considered to be cores similar to CORE 110 of FIG. 1, and can include a local cache and a pipeline.

Also for purposes of illustrating the disclosure, but not intended to limit embodiments, L2 230 is considered to be a cache similar to CACHE 120 of FIG. 1, and can include a control unit and a memory. Caches included in cores 212 and L2 230, and the memory, can be organized into cache lines. Further, while L2 230 and MEMORY 240 are shown in FIG. 2 as singular elements, it would be appreciated by one of ordinary skill in the art that, in embodiments, L2 230 and/or MEMORY 240 can comprise various numbers and/or types of memories, and/or arrangements of memories, such as caches included in memories, caches and/or memories connected hierarchically, and/or caches and/or memories connected in parallel with each other. Accordingly, as used herein, "L1" further refers to any form of cache integrated into or contained within a processor, and "L2" further refers to any next level cache (or, combination or arrangement of caches) connected between a local cache and another, higher level cache (e.g., an L3) and/or a main memory.

As previously described, a memory and/or a cache can be organized as cache lines of a particular size. For example, MEMORY 240 can be organized as cache lines, and the cache lines can be, for example, 128 bytes in size. In embodiments, a processor can include a cache, such as a local cache, and store a copy of data stored in a cache line of a memory, in the L1 cache. For example, MEMORY 240 includes cache line 246, which further contains data at locations 242 and 244. In embodiments, location 242 and/or 244 can be a location, in memory 240, of any unit of data ranging from a minimum size unit of data used by a processor (e.g., one byte) up to and including the amount of data comprising cache line 246 (e.g., 128 bytes).

In the example of FIG. 2, SMP NETWORK 220 comprises CONNECT 222 and CACHE REQ-RSP 224. In embodiments, CONNECT 222 can operate to interconnect cores 210 with L2 230 and/or MEMORY 240. CACHE REQ-RSP 224 represents a cache management element of COMPUTER 200. In embodiments, a cache management element can process cache line fetch requests and/or cache line fetch responses. Embodiments of a cache management element, such as CACHE REQ-RSP 224, can additionally have awareness of which processors and/or caches have copies of cache lines of a memory (e.g., line 242 of MEMORY 240), status of such cache lines (e.g., shared or exclusive, or read-only or read/write), and/or whether (and, which) processors have incurred an intervention associated with a cache line fetch.

The example of FIG. 2 illustrates cores 212 as connected to CONNECT 222 by means of interconnects 214, L2 230 by means of interconnect 216, and MEMORY 240 by means of interconnect 218. In embodiments, CONNECT 222 and/or interconnects 214, 216, and 218 can comprise a bus, point-to-point links, and/or a cross bar switch, or any combination or arrangement of these. For example, CONNECT 222 can be a crossbar or packet switch and interconnects 214, 216, and 218 can be point-to-point links connecting to switch input and/or output connections to CONNECT 222. In alternative embodiments, CONNECT 222 can be a bus and interconnects 214, 216, and 218 can be bus connections to, and/or extensions of, a bus comprising CONNECT 222.

In other embodiments, CONNECT 222 and/or interconnects 214, 216, and 218 can comprise a combination of buses, links, and/or switches. For example, while not shown, it would be apparent to one of ordinary skill in the art that cores of a processor chip, such as 212A-212D can interconnect amongst each other internal to CHIP 210A—such as by means of buses, links, and/or switches—and that interconnect 214 can be a single connection between CHIP 210A and CONNECT 222. It would be further apparent to one of ordinary skill in the art that CONNECT 222, and the manner of connecting processor cores, chips, modules and/or caches and memories, can comprise a variety of types, combinations, and/or arrangements of interconnection mechanisms such as are known in the art, such as buses, links, and/or switches, and that these can be arranged as centralized, distributed, cascaded, and/or nested elements.

An SMP network, and/or component thereof, can control and/or maintain status of cache lines amongst the plurality of caches. To illustrate, in the example of FIG. 2, CACHE REQ-RSP 224 is representative of cache request/response functions within an SMP network that can be associated with processing cache line fetch requests, responses, and/or interventions, among processors, caches, and/or memories interconnected by means of the SMP network. Such functions can include, for example, having awareness of the locations of cache lines among processors, caches, and/or memories, and/or having awareness of and/or participating in processing cache line fetches. In some embodiments, a processor can "snoop" the cache line requests of other processors and, in this way, can be aware of another processor having a copy of a missed cache line and, in some embodiments, can directly request a cache line fetch from another processor known to have a copy.

Embodiments can implement cache line request/response functions within a centralized unit, such as illustrated by CACHE REQ-RSP 224 in FIG. 2. In other embodiments, cache line request/response functions can be distributed amongst processors, caches, and/or memories. In embodiments, one or more cores and/or chips can perform some cache line request/response functions, and one or more caches can perform other cache line request/response functions. Using the example of FIG. 2, one or more of cores 212, and/or chips 210, and/or one or more caches (e.g., local caches of cores 212 and/or L2 230) can perform cache line request/response functions. Cores 212 can each maintain status of cache lines located within respective local caches, and L2 230 and/or CACHE REQ-RSP 224 can also maintain awareness and/or status of cache lines cached in the various local caches of cores 212. Cores 212 and/or L2 230 can maintain status of cache lines located within respective local caches and/or L2 230, while CACHE REQ-RSP 224 can receive and/or process interventions associated with cache line fetches directed to processors among cores 212.

As used herein, "SMP network" refers interchangeably to an SMP network as a whole (e.g., SMP NETWORK 220) and components of the SMP network (e.g., CACHE REQ-RSP 224), processors (e.g., chips 200 and/or cores 212), and/or caches (e.g., local caches of cores 212 and/or L2 230) used performing functions associated with cache line requests and responses. Continuing the example of FIG. 2, SMP NETWORK 220 can route communications between cores 212, L2 230, and/or MEMORY 240, such as by means of CONNECT 222. SMP NETWORK 220 can receive cache line fetch requests from the cores, cache line fetch responses, and/or intervention notifications and can route these among cores 212, L2 230, and/or MEMORY 240. SMP NETWORK 220 can have awareness of locations, within various caches, having copies of particular cache lines, and/or status of those cache lines, such as whether a particular cache line is shared amongst multiple processors and/or is subject to modification by a particular processor.

In embodiments, a processor can operate on data for one or multiple instructions using the cached copy of a memory cache line. For example, with reference to FIG. 2, CORE 212A can execute an instruction that uses data at location 242 in MEMORY 240 and can use the data at location 242 within a copy of cache line 246 in a local cache of CORE 212A. In embodiments, if a processor incurs a cache miss for that cache line used in processing (e.g., executing) instructions, the processor can initiate a fetch of the cache line, and the fetch can obtain a copy of the cache line from another cache within the computing system, or from the memory. For example, with reference again to FIG. 2, if CORE 212A uses data in cache line 246 but does not already have a copy of cache line 246 in a local cache, CORE 212A can initiate a request to fetch cache line 246. In embodiments, initiating a fetch of a cache line can comprise a core communicating to an SMP network information about the cache line (e.g., a memory address and/or whether it is requested as a shared or an exclusive use or, alternatively, read-only or read/write). In alternative embodiments, initiating a fetch of a cache line can comprise a core communicating information about the cache line directly to another component of a system (e.g., another core, a cache, or a memory) known to have a valid copy of the cache line.

As previously described, in embodiments, under some circumstances (e.g., when a cache line has shared status), multiple processors in a computing system can cache a copy of a cache line in a respective local cache of the processors. In processing a cache line fetch request, the request can be satisfied by providing a copy of the cache line from one of the processors having a copy. For example, CORE 212A can request a copy of cache line 246 and, if a local cache of another core among cores 212, has a valid copy of the cache line, a copy of cache line 246 can be transferred from the local cache of that core to CORE 212A to satisfy the fetch request. However, if another core does not have a valid copy of cache line 246, but L2 230 has a valid copy, a copy of cache line 246 can be transferred from L2 230 to CORE 212A to satisfy the fetch request. If no caches in the computing system have a valid copy of cache line 246, a copy of cache line 246 can be transferred from MEMORY 240 to CORE 212A to satisfy the fetch request.

From the example of FIG. 2, it can be seen that transferring cache lines between processors, caches, and/or memories has an associated utilization of those elements and/or the elements interconnecting them (e.g., an SMP network). Transferring cache lines can have an associated "overhead" in terms of, for example, numbers of instruction cycles associated with latency to complete a cache line transfer, data transfer bandwidth or throughput, and/or computing bandwidth or throughput. In embodiments, overhead can include increased utilization of data buses, inter-processor links, and/or inter-memory links to transfer the cache line; increased instruction execution latency (awaiting completion of the transfer) for a requesting processor to complete execution of one or more instructions that use the cache line; and increased processor and/or cache utilization in processors to manage and perform the transfer.

Transfer latency (time required to receive a cache line following a fetch request) can increase based on which element (e.g., a particular cache or a memory) provides a copy of a cache line to satisfy a fetch request. For example, transferring a cache line from a core within a different chip, or from another cache not local to a processor, can have a much higher latency in comparison to transferring a cache line from a core with the same chip, or a cache closer (having fewer interconnections) to a requesting processor. High transfer latency can cause a processor to wait longer to perform an operation, or to complete an instruction, that uses data within that cache line, and in turn this can reduce processor performance. For example, fetching data not included in a local cache of a processor can correspond to many hundreds or thousands of processor execution cycles.

In embodiments, if a cache line is used by multiple processors, as the processors use data in the cache line they can require transfers of that cache line between them. Under some circumstances, a controlling processor can have a cache line and another processor can request that cache line. Transferring the cache line can cause an intervention, which can further cause the controlling processor to demote or invalidate that cache line prior to completing using it (e.g., modifying data in that cache line), such that the controlling processor must subsequently re-fetch the cache line to complete that use (e.g., complete executing one or more instructions using that cache line).

Under other circumstances, processors can have copies of a cache line having shared status and another processor can obtain exclusivity to that cache line and become a controlling processor. For example, in embodiments a fetch of a cache line by a processor indicating that the fetch is associated with modifying the cache line can include an invalidation notification. Embodiments can communicate the invalidation indication to all processors (e.g., as a broadcast), all processors know to have a copy of the cache line (e.g., as a multicast), or to a particular processor known to have a copy. This can result in another form of an intervention, in which as a consequence of a processor obtaining exclusivity to that cache line, other processors having a copy of that cache line can have to invalidate their copies. Invalidating their copies of the cache line can require the processors to, subsequently, re-fetch that cache line. Transferring the cache line again to these processors can significantly increase overhead associated with that cache lines. Further, as just described, one or more of these processors re-fetching the cache line can cause the controlling processor to demote or invalidate that cache line, possibly before the controlling processor has completed using that line, in turn causing the controlling processor to re-fetch that line.

Accordingly, it can be advantageous to processor and/or overall computing system performance to reduce cache line fetches associated with multiple processors using a cache line. In particular, interventions associated with fetching a cache line can be an indication that the cache line is a hot cache line. As will be seen, embodiments can take advantage of intervention events to identify a cache line as a potentially or confirmed hot cache line. Based on such identification, embodiments can take actions associated with using potentially or confirmed hot cache lines to reduce fetches of such cache lines, and thereby obtain the associated performance advantages previously described.

Figures 3, 4:
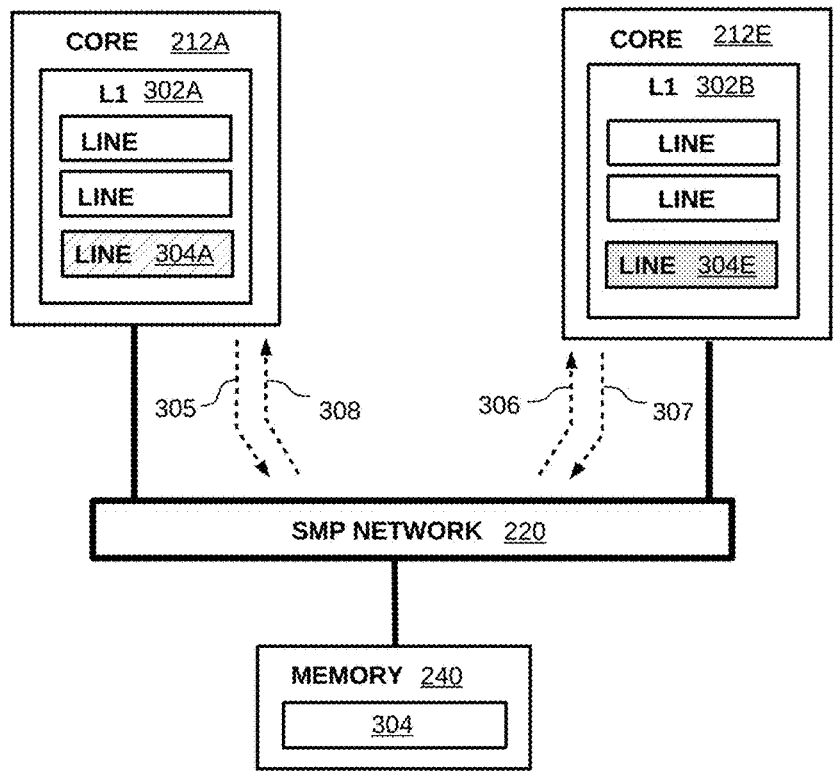
FIG. 3 is a block diagram illustrating an example of transferring a cache line, according to aspects of the disclosure.
FIG. 4 is a block diagram illustrating an example hot line table, according to aspects of the disclosure.

FIG. 3 illustrates an example intervention between processors, consistent with, but not intended to limit, embodiments. For purposes of illustrating the disclosure FIG. 3 uses a subset of COMPUTER 200 of FIG. 2 to illustrate the example. Cores 212A and 212E, of FIG. 2, are shown in FIG. 3 each having a local cache, L1 302A and 302B, respectively. To illustrate the example intervention, CORE 212E is shown in FIG. 3 having a copy of MEMORY 240 cache line 304 cached (e.g., stored) in L1 302B as LINE 304E, and CORE 212E is considered to have exclusivity to cache line 304.

CORE 212A can incur a cache miss for cache line 304 (e.g., associated with executing one or more instructions) and at 305, CORE 212A communicates a request to SMP NETWORK 220 to fetch cache line 304. SMP NETWORK 220 can be aware that CORE 212E has a copy of cache line 304, and at 306 SMP NETWORK 220 can obtain a copy of cache line 304 as LINE 304E stored in L1 302B.

As previously described, in embodiments fetching a cache line from a controlling processor can cause an intervention on the controlling processor. Embodiments can include an indication in, or in conjunction with, a cache line fetch response that the fetch caused an intervention. Continuing the example flow, at 307 CORE 212E provides the LINE 304E copy of cache line 304 to SMP NETWORK 220, and CORE 212E can indicate to SMP NETWORK 220, at 307, that the fetch caused an intervention on CORE 212E.

At 308, SMP NETWORK 220 communicates to CORE 212A a response to the cache fetch request at 305. The response can include the copy of cache line 304, obtained as LINE 304E from CORE 212E, to CORE 212A. CORE 212A can then store the copy of cache line 304 as LINE 304A in L1 302A. In embodiments, the response at 308 can include an intervention notification corresponding to the intervention on CORE 212E. In alternative embodiments, CORE 212A can receive the intervention notification separately from a response to the fetch request at 305. The intervention notification can, optionally in embodiments, include an identity of a processor (e.g., 212E) that incurred the intervention.

In some embodiments, a processor having an intervention (e.g., CORE 212E), and/or an SMP network, can communicate (e.g., broadcast or multicast) an indication of the intervention to a plurality of processors. Alternatively, in embodiments, a processor can snoop the requests and/or responses of other processors to determine that a cache line fetch caused (or, likely caused) an intervention on another processor. For example, at 307 CORE 212E can broadcast to multiple processors that it had an intervention on cache line 304. Alternatively, for example, at 307 and/or 308, SMP NETWORK 220 can broadcast to multiple processors that it had an intervention on cache line 304. In another example, another core (not shown in FIG. 3) can snoop the cache line requests of CORE 212A made at 305, and/or the response at 308, and determine, based on that request and/or response, that CORE 212E had an intervention regarding cache line 304.

In another example intervention, using FIG. 3 to illustrate, cache line 304 can be stored as LINE 304E in L1 302B as having shared status. In embodiments, a plurality of processors can have a copy of the same cache line (e.g., cache line 304) in a local cache with shared status, and various criteria can be applied to determine which processor should provide the copy of cache line 304. For example, a core (not shown) other than CORE 212E can have a copy of cache line 304, and CORE 212E can be selected to provide the copy because it has lower access latency, compared to other cores, to transfer the copy to CORE 212A.

Continuing the example alternative intervention, at 305 CORE 212A can request to fetch cache line 304 to obtain exclusivity to cache line 304 (e.g., to modify cache line 304). At 306, CORE 212E can receive the request for cache line 304E, and associated with the fetch for cache line 304 as exclusive to CORE 212A, CORE 212E can have an intervention corresponding to invalidating LINE 304E in L1 302B.

At 307, CORE 212E can communicate an intervention notification to SMP NETWORK 220 (or, alternatively, to CORE 212A directly). In embodiments, the intervention notification can be included in a response including LINE 304E or, alternatively, can be communicated independent of a response including LINE 304E. In embodiments, the intervention notification can be communicated, at 307 or in association with 307, to CORE 212A. Embodiments can, alternatively, communicate (e.g., broadcast) an intervention to all processors, or to a subset of processors (e.g., by multicast), such as just those processors having copies of cache line 304. In some embodiments, a processor can snoop the requests and/or responses of other processors to determine that a cache line fetch for exclusive use of the cache line caused (or, likely caused) an intervention on another processor. In yet other embodiments, a request to fetch a cache line for exclusive use can include an invalidation notification directed to processors having a copy (or, alternatively, to all processors), which can cause receiving processors to associate the invalidation with an intervention corresponding to their copies of the cache line.

In embodiments, such as in foregoing examples of FIGS. 1, 2, and 3, a processor can obtain a copy of a cache line, and/or exclusivity to a cache line, but may not immediately use data in that cache line. For example, a processor can fetch a cache line for speculative and/or for out-of-order instruction execution use of data in that cache line but may not complete operations using that cache line (e.g., to load or store data) for many hundreds, or even thousands, of instruction execution cycles. In another example, completing use of a cache line can depend on the results of executing another instruction. Under some circumstances that other instruction can itself take hundreds or thousands of instructions to complete, and thereby delay storing data to a cache line exclusive to the processor. For example, if an instruction loads or stores data from a different cache line not in the cache, if an instruction is a barrier instruction that depends on actions of another processor or program to complete, or an instruction is inherently complex and long-running, an instruction can delay using a cache line in a local cache.

Under conditions that delay a processor using, or completing using, data in local copy of a cache line, the potential can increase for other processors to request that cache line before the processor can complete using that line. Embodiments can detect likely hot cache lines, and based on awareness of a cache line as a likely hot cache line, can take actions to avoid unnecessarily fetching a cache line, such as suppressing issuance and/or execution actions of instructions, and/or allow more time for a response to a cache line fetch. As previously described, interventions associated with a cache line can indicate that a cache line is a hot cache line, and embodiments can utilize intervention notifications advantageously to identify a cache line as a potential and/or confirmed hot cache line.

FIG. 4 illustrates an example "hot line table" structure, and example contents thereof, to record cache lines as potential and/or confirmed hot cache lines. HOT LINE TABLE 300 comprises one or more table entries 330, in which each table entry is associated with a particular cache line (an "associated cache line"). Embodiments can advantageously use a hot line table, such as HOT LINE TABLE 300, to record potential hot cache lines and to subsequently take actions to avoid or reduce fetches and/or other operations associated with cache lines recorded in a hot line table. In embodiments, a hot line table or, alternatively, particular entries in a hot line table, can be associated with a particular processor. Embodiments can include a cache line in a hot line table, included within or associated with a particular processor, independent of whether the associated cache line is also cached in a cache of that particular processor.

Continuing the example of HOT LINE TABLE 300, each of entries 330 includes information associated with an associated cache line and potential hot line status. LINE ADDRESS 310 can be an identifier of the associated cache line in a computing system. For example, LINE ADDRESS 310 can be a subset, or hash, of address (e.g., main memory address) bits referencing an associated cache line. CACHE LOCATION 312 can be an identifier of a location of an associated cache line within a particular cache, such as a local cache of a processor. For example, CACHE LOCATION 312 can comprise an identity of a local cache in a processor and/or an address, or a subset or hash of address bits, of a location within a particular cache the associated cache line is stored. In embodiments, TAG 314 can identify an instruction that uses (or, alternatively, has used) data within an associated cache line, such as the oldest (or, first)

instruction that caused the processor to fetch that associated cache line. TAG 314 can have a value that indicates it is "invalid", which can signify, for example, that no instruction is presently associated with the cache line corresponding to that hot line table entry.

Table entries 330 in HOT LINE TABLE 300 further comprise "potential" ("P") and "confirmed" ("C") indicators, P 316 and C 318, respectively, which can identify an associated cache line as a potential and confirmed, respective, hot cache line. For purposes of illustrating the example hot line table of FIG. 4, but not intended to limit embodiments, P 316 and C 318 can be considered logic bits (or, flags) in which a value of '1' comprises a logical TRUE value, and a value of '0' comprises a logical FALSE value. For example, the states of probable and confirmed can be two states of a possible 4 states represented as a binary number combination of 2 bits. It would be apparent to one of ordinary skill in the art that potential and/or confirmed hot cache line indications can be other than logic bits, or flags, and can have associated values other than logical TRUE and FALSE, or '1' and '0'.

In embodiments, a cache line can be a potential hot cache line if a fetch of that cache line caused an intervention on one or more other processors. In a hot line table, such as HOT LINE TABLE 300, P 316 set to '1' can indicate that a cache line is included in the hot line table (i.e., attributes of a cache line stored in an entry of a hot line table are valid with respect to that particular cache line). Correspondingly, P 316 set to '0' can indicate that a cache line is not included in the hot line table (i.e., attributes of a cache line stored in an entry of a hot line table are not valid with respect to any cache line).

In embodiments, a cache line can be a confirmed hot cache line if a processor had the cache line in a local cache, the line had been previously identified as a potential hot cache line (i.e., has an entry in the table with P 316 set to '1'), and the processor had an intervention for that cache line (e.g., another processor issued a fetch of that cache line). In embodiments, C 318 having a logical TRUE (e.g., '1') value can indicate that an associated cache is a confirmed hot cache line. When a processor uses data in a confirmed hot cache line (e.g., executing an instruction references an operand in that cache line), embodiments can take particular actions, to be described in more detail further on in the disclosure, based on a cache line being a confirmed hot cache line.

Embodiments can track the type of an instruction that caused a cache line fetch. FIG. 3 illustrates entries of HOT LINE TABLE 300 including type indicator T 320. In embodiments, a type indicator can indicate, for example, that an instruction (e.g., an instruction recorded as TAG 314) caused a cache line fetch to read data from or, alternatively, to write data to, a cache line. In embodiments, a type indicator can include other aspects of an instruction, or processor execution of an instruction, associated with fetching a cache line. For example, a type indicator can include that the cache line was fetched in relation to speculative or, alternatively, out-of-order execution of an instruction, as well as, or in lieu of, whether or not the instruction reads or writes the cache line.

Embodiments of a hot line table can have a limited number of entries, such that all entries of the table are at times, or frequently, associated with potential hot cache lines. Under such conditions, identifying a new potential hot cache line can require embodiments to replace an entry in a hot line table (i.e., information associated with a cache line) with information associated with a different probable hot cache line. Embodiments can apply a variety of criteria to select an entry in a hot line table for replacement with information associated with another cache line.

For example, an embodiment can use a counter, included in entries of a hot linen table, to select an entry for replacement. FIG. 4 illustrates an example counter for selecting a hot line table entry for replacement according to a frequency of use criteria. Entries 330 of HOT LINE TABLE 300 include example counter COUNT 322. In an embodiment, COUNT 322 can be initialized to a particular value corresponding to, for example, to a number of instruction cycles that a particular cache line should remain unused (e.g., not referenced by instructions executed on the processor associated with the hot line table) before it is a candidate for being replaced by a different potential hot cache line. In embodiments, initializing the counter can be associated with determining that the cache line is a potentially hot cache line, and/or determining that the cache line is a confirmed hot cache line.

For purposes of illustration only, but not intended to limit embodiments, embodiments set COUNT 322 initially (e.g., when entering information about a cache line into an entry of a hot line table) to an integer value corresponding to, for example, a multiple of some number of instruction cycles (e.g., a value of '3', corresponding to, for example, thirty thousand cycles). At regular intervals, such as corresponding to another (possible lesser) number of instruction cycles, if the corresponding cache line has not been used by the processor, the processor decrements COUNT 322 by an integer value (e.g., '1'). On the other hand, each time (or, alternatively, after each of a particular number of times) that the associated cache line is subject to an intervention, the processor increments COUNT 322 by an integer value (e.g., '1'). When, in embodiments, a processor identifies a new potential hot cache line, and all entries in the hot line table have P=1 (i.e., have valid other hot cache lines in the table), the processor can select, for example, an entry having the lowest value of COUNT 322 to replace that entry with the new potential hot cache line. The processor can, then, "reinitialize" the selected hot line table entry to associate it with the newly identified potential hot cache line.

In embodiments, re-initializing the entry can include, for example, replacing the attributes of the previously associated potential hot cache line in that entry with attributes to associate the newly identified potential hot cache line. Re-initializing the hot line table entry can further include setting the P bit to 1 (to indicate that the entry is valid with respect to that new cache line), setting the C bit to 0 (to indicate that the new cache line is not as yet confirmed to be a hot cache line), and resetting the COUNT field to an initial count (or, time) value.

In another example, if COUNT 322 at some time becomes zero (or, alternatively, a particular other value) the processor can reset the P and C bits to '0', indicating that the entry is now unassociated with any cache line (i.e., no longer valid for any cache line) and, correspondingly available for use. An embodiment can prioritize using entries having P=0, and secondarily (e.g., when all entries have P bit set to 1) an entry having the lowest value of COUNT 322 among entries in the hot line table, to record newly identified probable hot cache lines.

While COUNT 322 and the foregoing description illustrates an example of a manner of re-using, and/or invalidating, entries in a hot line table, this is not intended to limit embodiments. It would be appreciated by one of ordinary skill in the art that embodiments can apply a variety of criteria, and/or attributes of a cache line in a hot line table to select particular entries in the hot line table to record newly identified potential hot cache lines, and/or to invalidate entries in such a table. For example, COUNT 322 can be, alternatively, a time value, and can represent, for example, the last (or, most recent) time that an associated cache line was used by the processor, or that an associated cache line was subject to an intervention (or, alternatively, other forms of contention among processors for a cache line). An embodiment can, accordingly, apply a least recently used criteria to select an entry in a hot line table for replacement.

In embodiments, HOT LINE TABLE 330, and or contents thereof, can be a table included in each of a plurality of processors (which can be some, but not necessarily all processors) to identify potential and/or confirmed hot cache lines used among a plurality of processors. In alternative embodiments, particular entries of a hot line table can be associated with particular processors, as well as particular (associated) cache lines. For example, entries in a hot line table can additionally include an identify of processor that caused a fetch of an associated cache line. A hot line table can be included in an SMP network, which can in turn make use of processor identities in an entry of a hot line table. In yet other embodiments, elements of a hot line table can be incorporated into other structures and/or components of a processor and/or computing system. For example, C, P, T indicators and/or a COUNT of a hot line table can be incorporated into a cache, such as (for example), a local cache of a processor or an L2 cache, and a hot line table can include only a line address, cache location, and/or instruction associated with a cache line while other elements of a hot line table entry (e.g., P, C, T, and/or COUNT) can be included in a hot line table separate from the cache.

The example HOT LINE TABLE 300 of FIG. 4 is for only purposes of illustrating the disclosure, and is not intended to limit embodiments. It would be apparent to one of ordinary skill in the art that embodiments can record potential hot cache lines in a variety of alternative structures, and including various attributes of such a cache line other than as illustrated in the example hot line table entries illustrated by hot line table entries 330. Accordingly, as used herein, references to a hot line table and/or entries of a hot line table are understood to refer generically to structures other than a table, in or associated with a processor and/or computing system, such as are known in the art and suitable for recording potential hot cache lines and attributes thereof.

Figure 5:
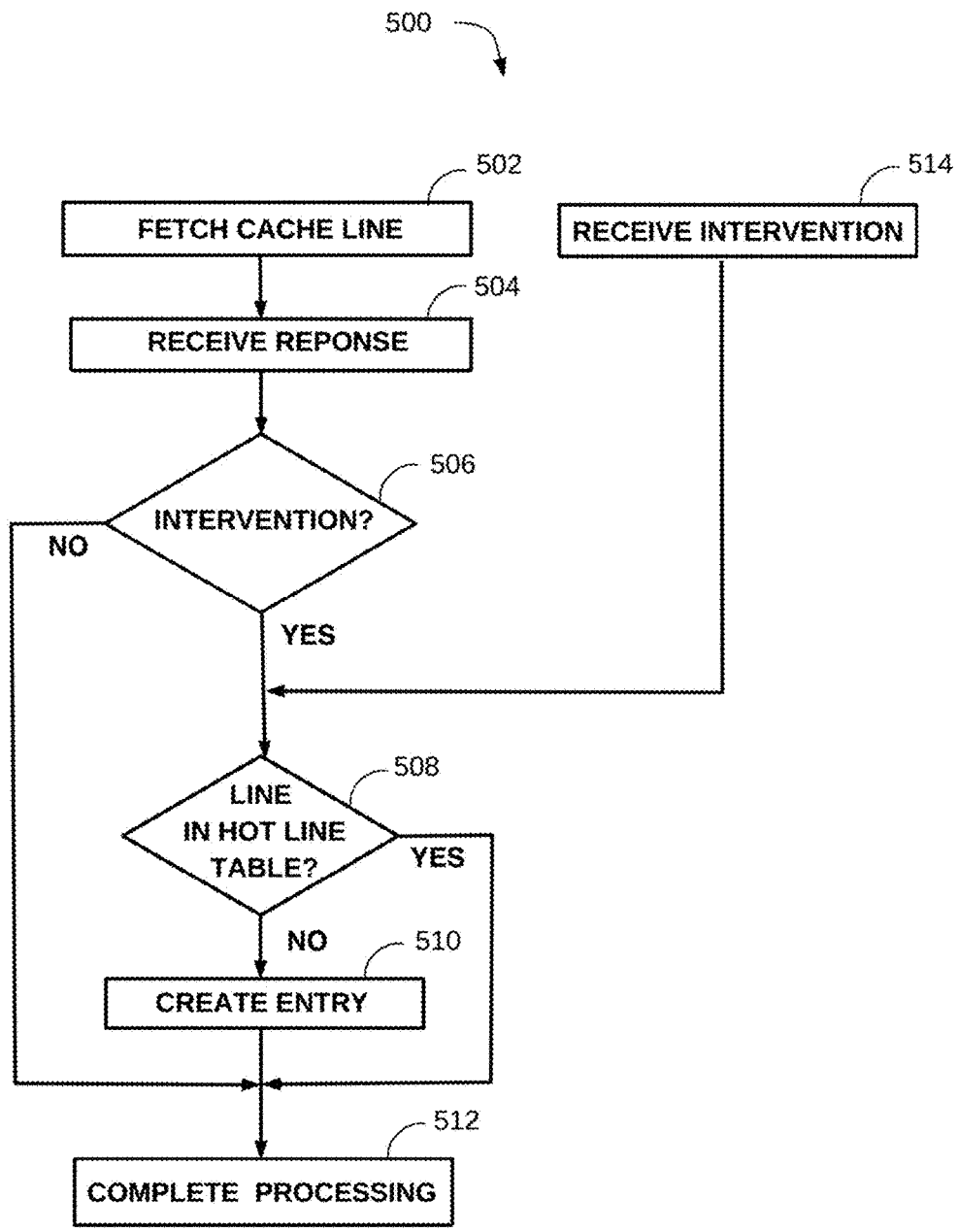
FIG. 5 is a flowchart that illustrates an example method to process an intervention, according to aspects of the disclosure.

FIG. 5 illustrates an example method, 500, to identify a potential hot cache line. For purposes of illustrating the example method, in describing method 500 "local processor" refers to a processor similar to that of CORE 110, in FIG. 1, having local (e.g., L1) cache similar to that of CACHE 120, in FIG. 1, and having a hot line table according to the example of HOT LINE TABLE 300 of FIG. 4. However, this is not intended to limit embodiments. It would be appreciated by one of ordinary skill in the art the embodiments can employ a variety of processors other than that of example CORE 110 and/or caches other than that of the example of CACHE 120. Further, as previously discussed, it would be apparent to one of ordinary skill in the art that attributes of a hot cache line, such as are included in the example of FIG. 4, and/or placement and/or processing of these attributes within a computing system (e.g., within a processor, cache, and/or SMP network) can be embodied in a variety of implementations other than the local processor and hot line table used to illustrate the example of method 500.

At 502, the local processor initiates a cache line fetch for a "missed cache line" not stored in a local cache of the local processor. In embodiments, a cache line fetch can be a result of, for example, the local processor executing an instruction, or portion of an instruction (which can be according to normal sequential execution or, alternatively, speculatively or out-of-order) that references data in the missed cache line.

At 504, the local processor receives a response to the cache line fetch. In embodiments, the response can include the missed cache line, and can further include a notification (e.g., a flag) that fetching the missed cache line caused an intervention on another, "remote", processor. Accordingly, at 506 the local processor determines if the request to fetch the missed cache line caused an intervention on a remote processor. If so, at 508 the local processor determines if the missed cache line is included in a hot line table (e.g., a hot line table included in the processor or, alternatively, in one or more other components of the computing system).

If, at 508, the local processor determines that the missed cache line is not included in a hot line table, the local processor (or, another component of a computing system managing the hot line table) creates an entry in a hot line table in association with the missing cache line. In embodiments, a hot line table can be of a fixed number of entries, and "creating" an entry in the table can comprise finding an unused entry, or replacing another entry in the table, such as previously described in relation to the example hot lien table of FIG. 4. In alternative embodiments, the number of entries in a table can be variable, and creating an entry for the missed cache line can include, for example, adding storage to the table to store that entry.

At 510, creating an entry in a hot line table can comprise storing attributes of the missed cache line in the entry, such as illustrated in the example of FIG. 4. For example, in embodiments, at 510 creating the entry can comprise initializing the entry similar to the manner of re-initializing a hot line table entry described in the foregoing discussion of the example of FIG. 4.

At 512, the local processor completes processing of the fetch initiated at 502, and/or the response received at 504. In embodiments, completing processing, at 512, can include storing the missed cache line in the processor's local cache, and/or storing the hot line table entry in a storage medium (e.g., a memory, or one or more processor registers). In completion processing, at 512, embodiments can include notifying an SMP network that the fetch of the missed cache line caused an intervention (e.g., in the case that the processor having the intervention communicated the intervention to only the processor requesting the cache line), and the notification can include an identity of the local and/or remote processors.

If, at 506, the response does not indicate that the missed cache line fetch caused an intervention, the local processor, at 512, completes processing. In embodiments, completing processing in this case can, at 512, comprise storing a copy of the missed cache line (received at or in conjunction with 504) in a local cache of the local processor and omit processing related to a hot line table.

As previously described, an intervention can be associated with a processor having a copy of a cache line in shared status and another processor can request that cache line with exclusive access. In embodiments, multiple processors can receive an intervention notification (e.g., an embodiment can broadcast, or multicast, an intervention notification to other processors) including processors that did not request a fetch of the cache line that caused the intervention. Accordingly, at 514 in example method 500, a processor can receive an intervention notification associated with another processor having had an intervention (e.g., another processor also having a copy of the cache line in shared status and receiving the fetch request). In embodiments, at 514, a processor can receive an intervention notification as a result of the processor (or, alternatively, an SMP network) snooping cache line fetch requests by other processors. In response, processors in embodiments can perform 508-512 of method 500.

Figure 6:
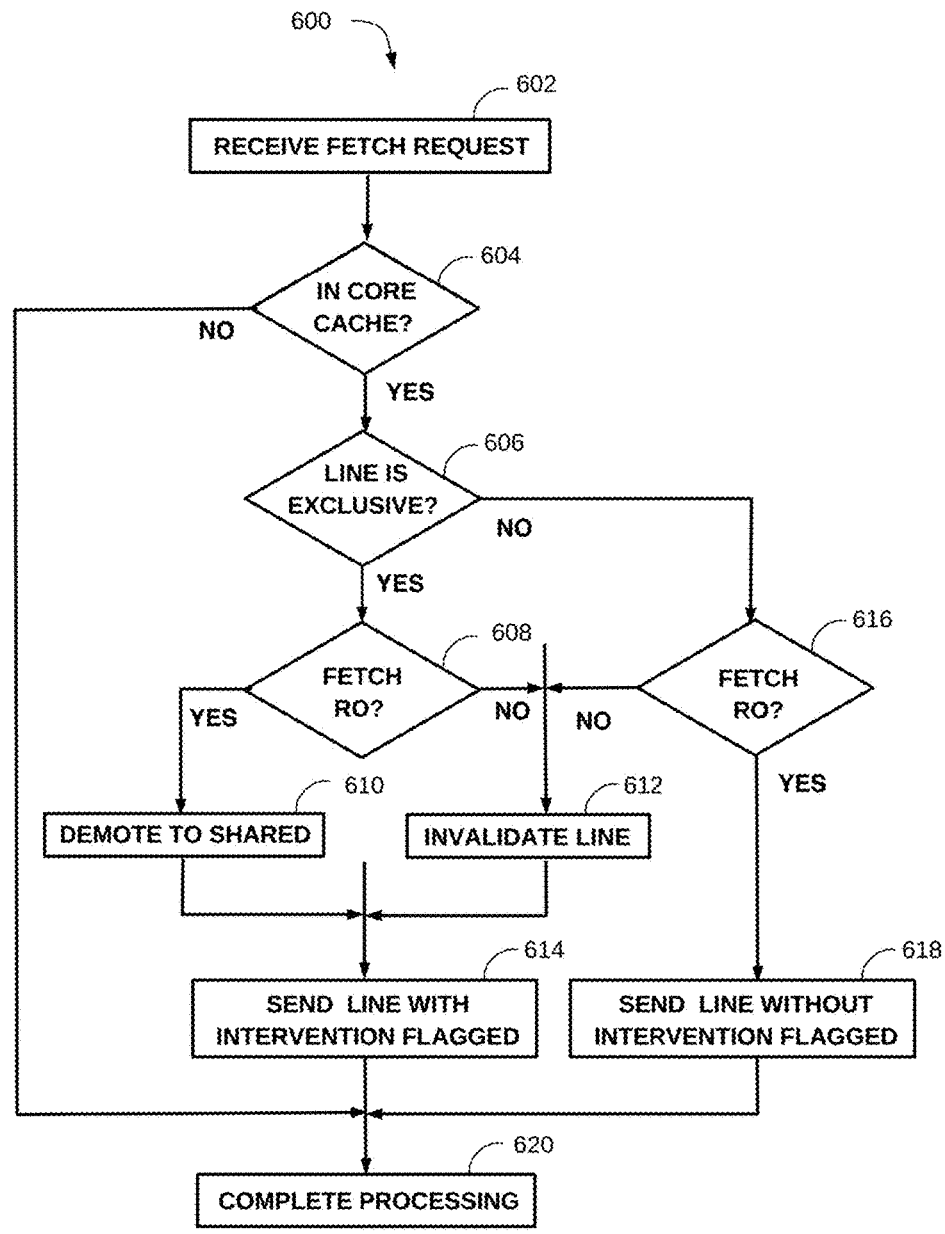
FIG. 6 is a flowchart that illustrates an example method to communicate an intervention, according to aspects of the disclosure.

FIG. 6 Illustrates an example method, 600, for processing an intervention on a remote processor. For purposes of illustrating example method 600, but not intended to limit embodiments, method 600 is described in the context of local and remote processors, similar to processors used to illustrate example method 500.

At 602, a local processor receives a fetch request associated with a missed cache line of a remote processor. In embodiments, as previously described, a local processor can receive a fetch request in a variety of methods and/or from a variety of sources, such as by means of direct communications or, alternatively, by means of broadcast or multicast communications, and from a remote processor and/or from an SMP network.

At 604, the local processor determines if it has a copy of the missed cache line in a local cache. Embodiments of a local processor can, for example, inspect a directory of a local cache to determine if the processor has a copy of the missed cache line. If, at 604, the local processor has a copy of the missed cache line, at 606, the local processor determines if it has exclusivity to the missed cache line.

At 606, if the local processor determines that it has exclusivity to the missed cache line, at 608 the local processor determines if the fetch request indicates that the missed cache line is requested read-only (or, as shared) or, alternatively, requested read/write (or, as exclusive). If, at 608, the local processor determines the fetch request the missed cache line is requested read-only (or, as shared), at 610 the local processor cedes exclusivity to the cache line and "demotes" the status of the missed cache line from exclusive to shared. Alternatively, if the local processor, at 608, determines the fetch request indicates that the missed cache line is requested read/write (or, as exclusive) or, alternatively, does not receive an indication that the missed cache line is requested read-only (or, as shared), at 612 the local processor invalidates its local cache copy of the missed cache line (e.g., because the remote processor may, subsequent to receiving the copy of the missed cache line, modify the missed cache line such that the local processor copy becomes invalid).

At 614, the local processor sends, or transfers (e.g., in the case of invalidating the missed cache line at 612), the missed cache line to the remote processor, and includes an intervention notification indicating that the remote processor fetching the missed cache line resulted in an intervention on the local processor. In embodiments, a local processor can, at 614, communicate the missed cache line, and/or intervention notification, directly to the remote processor, to satisfy the remote processor fetch request. In alternative embodiments, the local processor can communicate the missed cache line and/or intervention notification by means of an SMP network. For example, as previously described, an SMP network can obtain the missed cache line, and/or intervention notification, from the local processor, and the SMP network can forward the missed cache line and/or intervention notification to the remote processor.

If, at 606, the local processor determines that it does not have exclusivity to the missed cache line (e.g., the missed cache line is in use as shared and/or read-only), at 616 the local processor determines if the fetch request indicates that the missed cache line is requested read-only (or, shared) or, alternatively, read/write (or exclusive). If, at 616, the local processor determines the fetch request indicates that the missed cache line is requested read-only (or, shared), at 618 the local processor sends the cache line to the remote processor (e.g., directly or, alternatively, by means of an SMP network) without an intervention notification or, alternatively, with a positive indication that an intervention did not occur on the local processor. Alternatively, at 616, if the local processor determines the fetch request indicates that the missed cache line is requested for modification (e.g., read/write), the request does not indicate whether it is read-only, or, alternatively, for example, the request is for exclusive status of the cache line by the requesting processor, at 612 the local processor invalidates its local cache copy of the missed cache line (e.g., because the remote processor may, subsequent to receiving the copy of the missed cache line, modify the missed cache line such that the local processor copy becomes invalid).

At 620, the local processor (and/or an SMP network) completes processing associated with receiving the fetch request. In embodiments, at 620 completing processing can include, for example, operations associated with a local processor demoting or invalidating a copy of the missed cache line. Embodiments can include, at 620, the local processors and/or an SMP network updating status associated with the missed cache line, and/or the local processor having had an intervention. Embodiments can include, at 620, an SMP network providing the missed cache line and/or intervention notification to a remote processor.

If, at 604 the local processor determines that it does not have a copy of the missed cache line in its local cache, at 620 the local processor and/or SMP network complete processing the fetch request. In embodiments, completing processing in this case, at 620, can include determining another possible source (e.g., another processor, cache, or memory) from which to obtain a copy of the missed cache line or, alternatively, communicating to the remote processor that there is not a copy of the missed cache line available (e.g., because another processor has exclusivity and does not cede that exclusivity in response to the fetch request).

Figure 7:
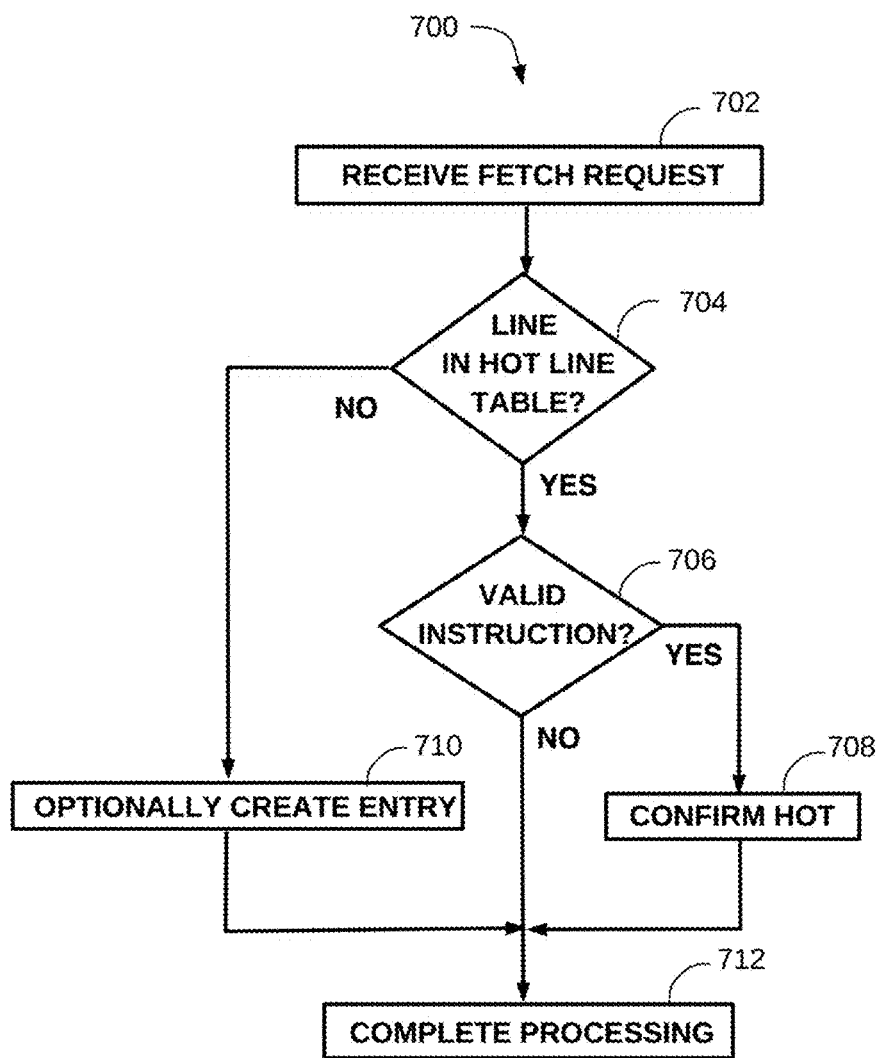
FIG. 7 is a flowchart that illustrates an example method to modify a hot line table, according to aspects of the disclosure.

In embodiments, as previously discussed, an intervention can signify that a cache line can be a hot cache line. Accordingly, in some embodiments, completing processing at 620 in method 600 can include creating or updating a hot line table. FIG. 7 illustrates an example method, 700, for processing a hot line table in association with an intervention on a processor. For only purposes of illustrating method 700, but not intended to limit embodiments, the method is described using the example of local and remote processors used to illustrate the examples of FIGS. 5 and 6, and the local processor used to illustrate the method 700 is considered to include a hot line table similar to HOT LINE TABLE 300 of FIG. 4

At 702, a local processor receives a request to fetch a missed cache line. In response, at 704 the local processor determines if the missed cache line is presently entered in the local processor's hot line table. In embodiments, determining that a cache line is in a hot line table can include using an address of the cache line (e.g., an address in a memory), or subset or hash of an address of the missed cache line, to index (i.e., select) an entry in the hot line table In alternative embodiments, determining that a cache line is in a hot line table can include comparing attributes of the missed cache line with attributes stored in entries of the hot line table (for example by storing the hot line table in a content-addressable type of memory). Embodiments can determine, at 704, that the missed cache line is in the hot line table by determining if the P bit of an entry matching the missed cache line is set to '1'.

If, at 704, the local processor determines that the hot line table includes an entry associated with the missed cache line, at 706 the local processor determines if the entry includes a valid instruction associated with the cache line. If so, at 708 the local processor sets the C bit of that entry to '1', to indicate that the cache line is confirmed to be a hot cache line. In embodiments, an entry can include a valid instruction if the instruction is an instruction in execution (or, alternatively, still pending execution) in a processor. For example, in embodiments, an instruction can be in execution if it has not completed in its entirety.

An instruction can be incomplete (i.e. not completed in its entirety), in embodiments, if, for example, one or more execution units in an instruction pipeline are processing the instruction; or, in another example, execution of the instruction, or a portion of the instruction, has been suppressed or delayed awaiting completion of another event or condition, such as results of another instruction or a fetch of other data and/or cache lines. In another example, an instruction can be in execution if it has not yet used data in the requested cache line. In alternative embodiments, if at 704 the local processor determines that the missed cache line is in a hot line table, the local processor can omit 706 and, at 708, can set the C bit in the hot line table entry to '1'.

If, at 704 the local processor determines that the missed cache line is not in a hot line table, the local processor can, optionally, at 710 create an entry, associated with the requested cache line, in a hot line table. At 710 creating the entry can comprise initializing, or re-initializing, the entry similar to the manner of re-initializing a hot line table entry described in the foregoing discussion of the example of FIG. 4. In some embodiments, creating an entry, at 710, can include setting both P and C to '1' in the entry. Embodiments can select an entry in a hot line table for replacement, similar to as described in reference to HOT LINE TABLE 300 in FIG. 4.

At 712, the local processor completes processing. In embodiments, at 712, completing processing can include taking actions on instructions in execution by a local processor. Such actions can affect initiating and/or continuing execution of particular instructions, and/or actions associated with the status of a cache line subject to an intervention on the local processor. Embodiments can perform 704-712 as an aspect of completing processing, such as at 620 of method 600, on a processor having had an intervention for a request from another processor to fetch a missed cache line.

Figure 8:
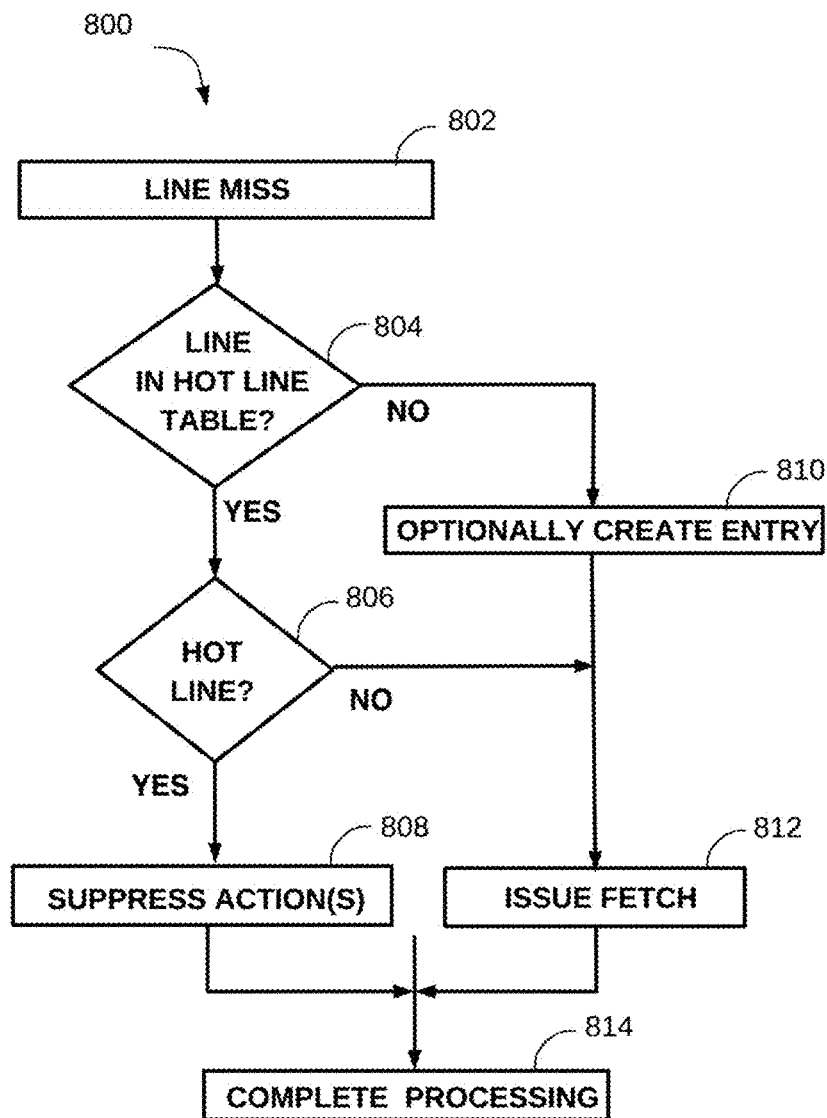
FIG. 8 is a flowchart that illustrates an example method to process a hot cache line, according to aspects of the disclosure.

FIG. 8 illustrates an example method, 800, to process a cache line miss, consistent with embodiments. For only purposes of illustrating method 800, but not intended to limit embodiments, the method is described using the example of a local and remote processor similar those processors used in the foregoing descriptions of FIGS. 5, 6, and 7. Further, for purposes of illustrating method 800, but also not intended to limit embodiments, also similar to the example of method 700, the local processor is considered to include a hot line table according to the example hot line table, 300, of FIG. 4.

At 802, in FIG. 8, a local processor incurs a cache miss. In embodiments, the cache miss can be a result of conditions similar to those described in reference to operation 502 of method 500 in FIG. 5. Additionally, in embodiments, operation 802, and/or other operations of example method 800, can be performed in conjunction with operation 502 and/or other operations of example method 500. Operations of method 800 can be performed in parallel with some or all operations of method 500, or can be performed serially in relation to some or all operations of method 500. For example, in embodiments method 800 can be performed as part of operation 502 or, alternatively, as part of operation 512 of method 500. Alternatively, method 800 and method 500, or select operations of both, can be performed in parallel in response to a cache miss signified by operation 802.

Continuing the example of method 800, associated with the cache line miss, at 804 the local processor determines if the missed cache line is entered in the local processor's hot line table. In embodiments, a missed cache line can be entered into a hot line table, if, for example, the local processor had previously had a copy of the cache line in a local cache and subsequently had an intervention associated with another processor requesting the cache line for exclusive use. Embodiments can determine, at 804, if the missed cache line is in the hot line table in a manner similar to that previously described in regard to operation 704 of method 700. In some embodiments, the local processor can at 804, determine that the missed cache line is in an entry of the hot line table based on that entry having the P bit set to '1'.

If, at 804, the local processor determines that the missed cache line is in the hot line table, at 806 the local processor determines if the missed cache line is a confirmed hot cache line. Embodiments can make the determination at 804, for example, by checking that the C bit of the hot line table entry is '1'. Embodiments can confirm that a cache line is a hot cache line, and set the C bit of a hot line table entry accordingly, using for example, method 700 or operations thereof. In alternative embodiments, determining, at 806, that a cache line is a hot cache line can be based on the cache line being a potential hot cache line (e.g., the P bit in an entry of a hot line table being set to '1'), and checking that a cache line is a confirmed hot cache line can be optional.

If, at 804, the local processor determines that the missed cache line is not in the hot line table, at 810 the local processor can, optionally, create an entry in the hot line table associated with the missed cache line. At 810, creating the entry can comprise initializing, or re-initializing, the entry similar to the manner of re-initializing a hot line table entry described in the foregoing discussion of the example of FIG. 4, which can include replacing an entry in a hot line table.

At 812, the local processor issues a cache line fetch request, to obtain the cache line (e.g., if the local processor requires exclusivity to, or read/write use of, the cache line), or to obtain a copy of the cache line (e.g., if the local processor requires only shared, or read-only, use of the cache line). Embodiments can, at 812, request a fetch of the cache line in a manner similar to that described in regard to operation 502 of method 500 in FIG. 5.

As previously described, hot cache lines can be frequently transferred among processors and/or caches, which can in turn increase overhead in ways that can correspondingly reduce processor and/or computing system performance. Embodiments that employ methods and/or systems to avoid or reduce overhead associated with cache line transfers can realize accompanying processor and/or computing system performance advantages. As illustrated by example method 800, if the local processor determines, at 806, that the missed cache line is a confirmed hot cache line (e.g., has C=1 in a hot line table), at 808 the local processor determines actions associated with, or affected by, the cache miss that can be suppressed. Suppressing actions, at 808, can help embodiments of a computing system to avoid performing operations, or actions, associated with a hot cache line that would otherwise require a processor to immediately fetch (or, re-fetch) that cache line and potentially increase the frequency of transfers of the cache line among or between processors, caches, and/or memories. Suppressing actions, at 808, can correspondingly avoid, or reduce, overhead associated with cache line transfers and to realize accompanying performance advantages.

In embodiments, suppressing an action can comprise, for example, deferring, delaying, and/or discontinuing an action. Suppressing actions can comprise, for example, keeping instructions that may use a confirmed hot cache line from issuing, suppressing a cache fetch for a missed and confirmed hot cache line, and or allowing more time (e.g., delaying use of a cache line) for a response to a cache line miss from another processor (and/or an SMP network). In another example, suppressing actions can include retrying execution of an instruction (and/or portion of an instruction) that caused the miss, and/or can include processing the miss, and/or fetch request, at a later time.

In other example embodiments, suppressing actions can include disabling (or, discontinuing) out-of-order execution of instructions, deferring retry of the instruction, or a portion thereof, that uses (or depends upon a result stored in) the missed cache line until, for example, that instruction is the very next instruction ready to complete in the pipeline. It would be appreciated by one of ordinary skill in the art that embodiments can suppress, defer, or retry a variety of processor, instruction execution, and/or cache line transfer operations based on having confirmed a missed cache line as a hot cache line, other than those just described, to reduce or avoid cache line transfer overhead associated with a confirmed hot cache line.

At 814 the local processor completes processing. In embodiments, completing processing in association with suppressing actions at 808, and/or in association with issuing the cache line fetch at 812, can include, for example, altering which instructions are processed, or an order of processing instructions, in an instruction pipeline. Completing processing in association with suppressing actions can include, for example, completing or flushing instructions in an instruction pipeline. One of ordinary skill in that art would be able to envision a variety of actions processors, caches, SMP networks, and/or other components of a computing system can take to complete processing associated with 808 and/or 812, such as based on various states of these elements of a computing system Embodiments can modify, or update, entries in a hot line table as part of a processor executing instructions associated with cache lines in a hot line table. Such modification can serve, in embodiments, for example to maintain most recent or relevant status of particular cache lines entered in a hot line table, and/or to make less relevant entries (e.g., associated with cache lines that have become less likely to be subject to contention, or hot) available for use with other potentially hot cache lines.

Figure 9:
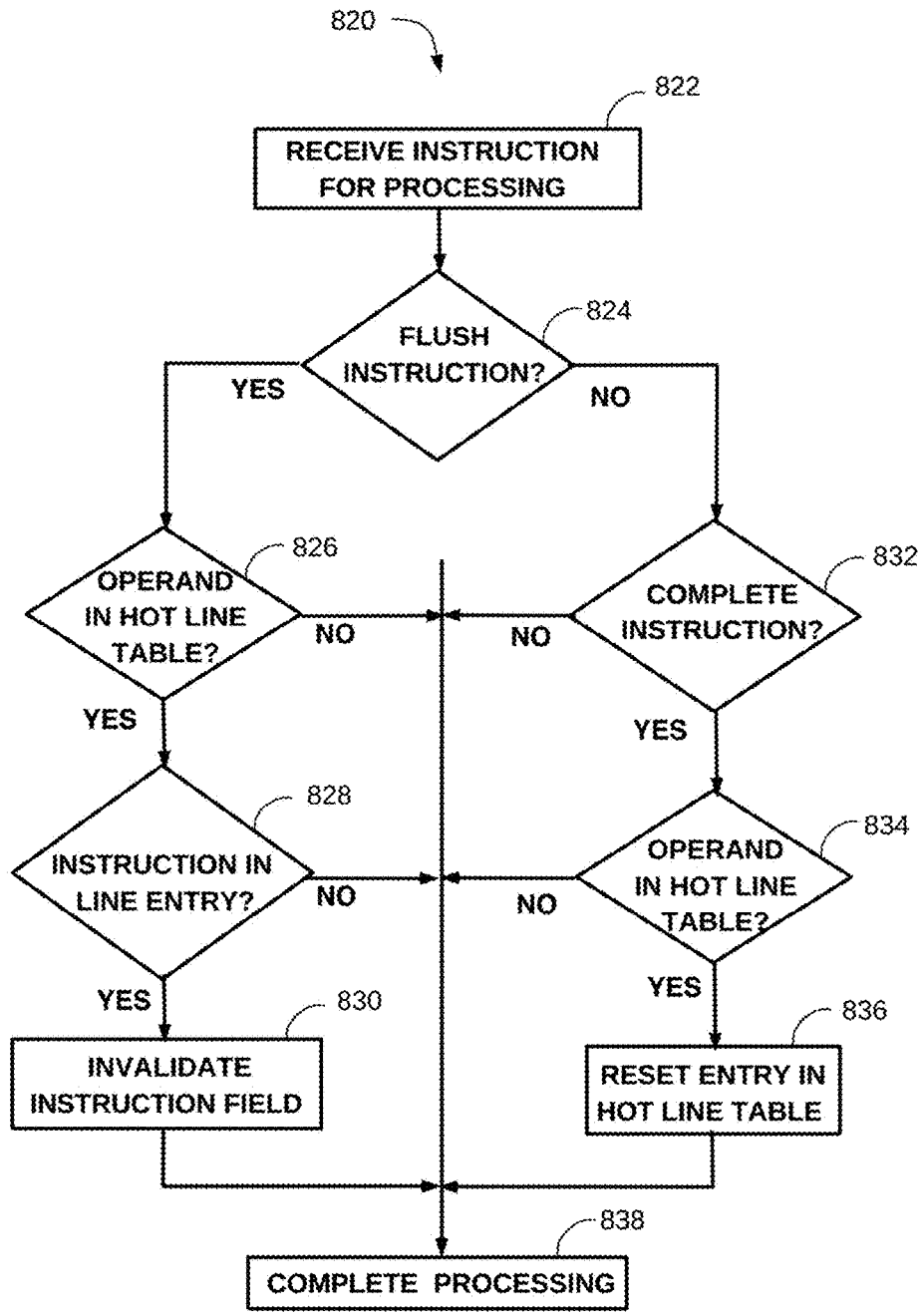
FIG. 9 is a flowchart that illustrates an example system to process an operation associated with a hot cache line, according to aspects of the disclosure.

FIG. 9 illustrates example method 820 for updating an entry in a hot line table.

Again, for purposes of illustrating the disclosure, but not intended to limit embodiments, method 820 is described with reference to a processor according to the example processors (e.g., cores 110) of FIG. 1 using a hot line table according to the example of HOT LINE TABLE 300 in FIG. 4.

At 822, a processor (e.g., a unit of an instruction pipeline) receives an instruction (or, portion thereof) for processing or, alternatively, initiates an operation associated with processing (e.g., executing) an instruction. At 824, the processor determines if the instruction is to be flushed from the processor (e.g., a unit or stage of an instruction pipeline). For example, in embodiments a processor can have speculatively executed an instruction, or portion of an instruction, associated with a branch path in a program, and the program may ultimately not execute that path. Accordingly, the processor can flush the instruction (e.g., terminate processing the instruction in various units and/or stages of an instruction pipeline, or various cycles of a multi-cycle processor).

If the processor determines, at 824, to flush the instruction, at 826, the processor determines if the instruction uses (e.g., the instruction references an operand in) a cache line entered in the hot line table. If so, at 828 the processor determines if the instruction is the same as the instruction identified in the TAG field of the hot line table entry associated with the cache line. If so, at 830 the processor invalidates the instruction field of the entry in the hot line table associated with the cache line. In embodiments, invalidating the instruction field can indicate that there is no longer an instruction under execution in association with the cache line matching the entry in the hot line table, but that the cache line itself can yet be a potential or confirmed hot cache line based on, for example, interventions preceding (or, subsequent to) flushing the instruction.

If, at 826 the processor determines that the instruction does not use a cache line entered in the hot line table or, if at 828 the processor determines that the instruction is not the same as the instruction identified in the TAG field of an associated entry in the hot line table, at 838 the processor completes processing. In embodiments, at 838 completing processing can include, for example, operations necessary for the processor to complete flushing the instruction.

If, at 824 the processor determines that the instruction is not to be flushed, at 832 the processor determines if the processor can complete (or, alternatively, is in the process of completing) execution of the instruction. For example, in embodiments a processor can complete an instruction if all stages of execution in an instruction pipeline executing the instruction have, or can, complete their associated processing of the instruction (e.g., storing the results of the instruction into a cache line cached in a local cache of the processor). If, at 834, the processor determines that it can complete the instruction, the processor determines if the instruction uses a cache line entered in the hot line table. If so, at 836 the processor resets the associated hot line table entry. At 836, in embodiments resetting an entry in a hot line table can comprise operations similar to the manner of re-initializing a hot line table entry described in the foregoing discussion of the example of FIG. 4. In embodiments, resetting an entry in a hot line table, at 836, can comprise setting an instruction tag of the entry to an "invalid" value.

If, at 832 the processor determines that it cannot complete the instruction or if, at 834 the processor determines that the instruction does not use a cache line entered in the hot line table, at 838 the processor completes processing. In embodiments, completing processing can include, for example, operations for the processor to complete the instruction.

Embodiments of methods of the disclosure—such as the foregoing example methods 500, 600, 700 800, and 820—can record status (e.g., potential and/or confirmed hot cache line) and/or attributes of a cache line (such as illustrated by example entries 330 of HOT LINE TABLE 300 in FIG. 4) in a variety of data structures or memory elements (e.g., a memory, a cache, and/or hardware registers) within a processor, one or more caches, and/or components of an inter-processor network (e.g., an SMP network).

Embodiments that utilize a hot line table, such as the example of FIG. 4, can have the advantage of higher degrees of integration of the status and/or attributes of hot cache lines with components of a processor that utilize hot line status and/or attributes (e.g., a local cache and/or circuits that suppress actions associated with hot cache lines). A hot line table can be compact and can have the advantage of ease of design and management (e.g., re-use of entries can be managed according to algorithms such as least recently, or least frequently, used). Embodiments that utilize a hot line table within a processor can have the advantage that the hot line table can be incorporated into hardware registers within a processor.

Embodiments that utilize an inter-processor network to communicate cache line requests and responses can have the advantage of including intervention notifications with cache line responses, and/or enabling processors coupled to the inter-processor network to snoop cache line requests, responses, and/or intervention notifications to determine potential and/or confirmed hot cache lines.

As previously described, embodiments that can avoid or reduce overhead associated with cache line transfers can realize processor and/or computing system performance advantages. Accordingly, embodiments of the disclosure can include a system for identifying a hot cache line and that taking actions associated with hot cache lines to avoid or reduce cache line transfers and/or operations associated with cache line transfers.

Figure 10:
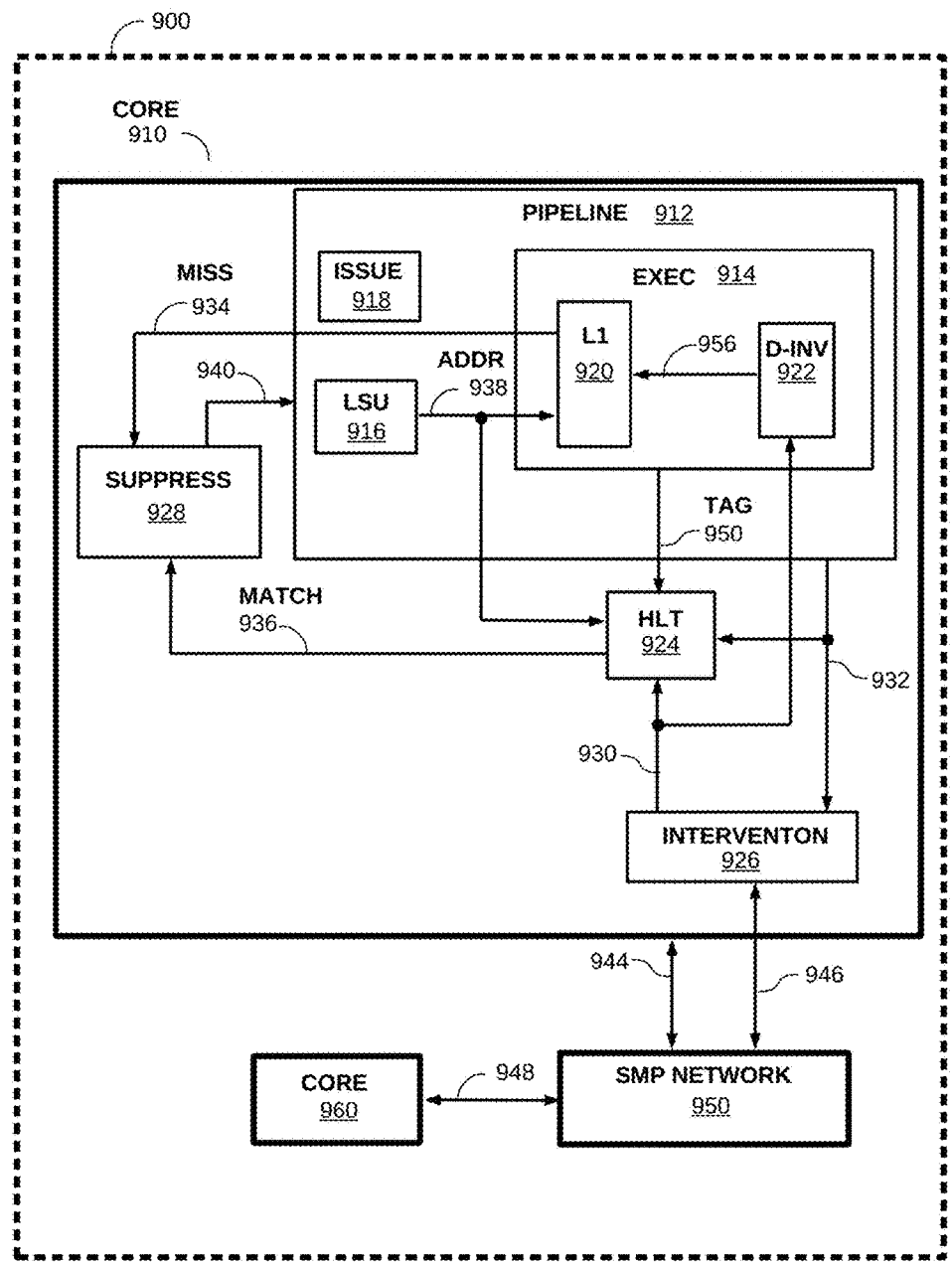
FIG. 10 is a block diagram that illustrates an example system to process a cache line, according to aspects of the disclosure.

FIG. 10 illustrates an example system, 900, that can identify hot cache lines and take corresponding actions to reduce cache line transfers and/or associated operations, such according to methods of the disclosure. For purposes of illustrating the example system, but not intended to limit embodiments, FIG. 10 depicts processors and an SMP network similar to the examples of FIG. 1 and FIG. 2, respectively, and which can be configured in a computing system such as example COMPUTER 200 of FIG. 2.

FIG. 10 depicts example system 900 comprising CORE 910 and CORE 960 connected to SMP NETWORK 950. Embodiments of SMP NETWORK 950 can be, for example, similar to SMP NETWORK 220 of FIG. 2. In embodiments, COREs 910 and 960 can be processors similar to example CORE 110, of FIG. 1. Accordingly, CORE 910 is shown in FIG. 10 including PIPELINE 912, which can be an instruction pipeline similar to PIPELINE 150 of FIG. 1. To simplify the example, but not intended to limit embodiments, PIPELINE 912 is shown including a load/store unit, LSU 916, an instruction issue unit, ISSUE 918, and an execution unit, EXEC 914. EXEC 914 includes a cache, L1 920, and a directory invalidation unit, D-INV 922.

CORE 910 further includes hot line table HLT 924; an intervention circuit, INTERVENTION 926; and, a contention suppression circuit, SUPPRESS 928. Embodiments of L1 920 can be, for example, a local cache similar to L1 CACHE 152 of FIG. 1. Embodiments of a hot line table, such as HLT 924, can be, for example, similar to example HOT LINE TABLE 300 of FIG. 4. While CORE 960 can the similar, or identical, to CORE 910, CORE 960 is shown in FIG. 10 without further detail to simplify the example of system 900.

To illustrate an example operation of an intervention circuit, and/or a system incorporating an intervention circuit, in an embodiment, CORE 960 can request a fetch of a missed cache line. In the example of FIG. 10, CORE 960 can request the fetch using example interface 948. In embodiments, interface 948 can be similar to interfaces 214 illustrated in FIG. 2.

In response to receiving the request, SMP NETWORK 950 can determine that another, remote, processor (e.g., a core) that has a copy of the missed cache line. For purposes of illustrating the example, SMP NETWORK 950 can determine that CORE 910 has a copy of the cache line requested by CORE 960. Accordingly, SMP NETWORK 950 can communicate the fetch request to CORE 910, using example interface 944. In embodiments, interface 944 can be similar to interfaces 214 illustrated in FIG. 2.

In alternative embodiments, a processor (e.g., core 910) can receive a request to fetch a cache line (e.g., a missed cache line) or, alternatively, an indication of such a request, and the processor can determine that it has a copy of the requested cache line. In some embodiments, a processor (e.g., CORE 910) can receive the request (or, the indication) directly from a processor (e.g., CORE 960) issuing the request.

In response to processing the fetch request, a component of CORE 910, such as PIPELINE 912, can determine that CORE 960 requesting the cache line causes an intervention on CORE 910 associated with that cache line. In response, PIPELINE 912 (using this example, but not intending to limit embodiments) can communicate the intervention status to HLT 924 and/or INTERVENTION 926, using example interface 932. In embodiments, interface 932 can be any means of communicating information among units of a core, such as dedicating status wires, data buses, and so forth.

To simplify the example of system 900, in FIG. 10. HLT 924 is representative of a hot line table, such as in the example of HOT LINE TABLE 300, as well as functions within a processor that can create and/or update a hot line table (or, alternatively, potential and/or confirmed hot line status of a cache line), and can communicate status associated with entries in a hot line table to other components of the processor. However, it would be understood by one of ordinary skill in the art that embodiments can implement such functions with a variety of components, and/or arrangements of components, within a processor other that as illustrated in FIG. 10 by HLT 924.

Upon receiving the intervention status, HLT 924 can update a hot line table to create, update, or replace, an entry in a hot line table associated with the requested cache line. The intervention status received by HLT 924 can include whether the request from CORE 960 indicated to fetch the cache line read-only (or, shared) or read/write (or, exclusive). Embodiments of system 900 can perform methods similar to example methods 600 and/or 700 to update a hot line table. Embodiments can create, update, or replace an entry in a hot line table, in response to receiving an intervention notification, in manners previously described in relation to the foregoing examples of the disclosure. In particular, in embodiments a processor can update a hot line table, such as HLT 924, based on the received intervention notification to indicate that the requested cache line is a potential or confirmed hot cache line.

INTERVENTION 926, upon receiving the intervention status, can communicate an intervention notification to CORE 960, and can use, for example an interface illustrated as 946 to communicate the notification. In embodiments, interface 946 can be included in interface 944, or can comprise, or be included in another interface separate from interfaces, such as example interface 944, used to communicate cache line requests and responses.

SMP NETWORK 950, in response to receiving the intervention notification, can communicate the notification to CORE 960, using again, for example, interface 948. As similar to CORE 910, CORE 960 can include an intervention circuit (similar, for example, to INTERVENTION 926) and/or a hot line table and associated management component (similar, for example, to HLT 924). CORE 960 can create, update, or replace, an entry in a hot line table associated with the requested cache line, based on receiving the intervention notification.

Similarly, CORE 910 can receive an intervention notification associated with a request by CORE 910 to fetch a cache line. For example, CORE 910 can request a fetch of a cache line contained in a local cache of CORE 960, and the request can cause an intervention on CORE 960 associated with that cache line. Accordingly, CORE 960 can communicate an intervention notification to CORE 910 (e.g., by means of interfaces 948 and/or 946 and SMP NETWORK 950).

While the example of FIG. 10 illustrates INTERVENTION 926 and HLT 924 as components of CORE 910, this is not intended to limit embodiments. It would be apparent to one of ordinary skill in the art that an intervention circuit (e.g., INTERVENTION 926) and/or a hot line table (or, status and and/or attributes of a cache line, such as in example entries 330 of HOT LINE TABLE 300 in FIG. 4) wholly, or partially, in other components of a computing system. For example, an intervention circuit and/or elements of a hot line table can be a component of a processor, a component of an inter-processor network, or components distributed among processors and/or an inter-processor network.

As previously described, in embodiments a particular processor, such as CORES 910 and/or 960, can receive (or, snoop) intervention notifications associated with cache line fetch requests directed to other processors, such as by monitoring communications among processors and/or caches coupled to an SMP network. Accordingly, that embodiments are not limited to the present example of a processor (e.g., CORE 910) receiving intervention notifications associated with a request to fetch a cache line for that particular processor, and that embodiments can determine that an intervention occurred on other processors by alternative means, such as snooping cache line fetch requests and/or associated intervention notifications.

INTERVENTION 926 in CORE 910 can receive the intervention notification and can communicate the notification to HLT 924 and/or D-INV 922 using example interface 930. In embodiments, interface 930 can be any means of communicating information among units of a core, such as dedicating status wires, data buses, and so forth.

In embodiments, a directory invalidation unit (or, circuit), such as D-INV 922 in the example of FIG. 10, can receive an intervention notification and can communicate to (or, alternatively, operate on) a cache (e.g., L1 920) to invalidate a cache line associated with the intervention. In embodiments, HLT 924, in response to receiving the intervention notification can create, update, or replace an entry in a hot line table and can operate on the hot line table in manners previously described in relation to the foregoing examples of the disclosure.

As previously described, a processor can use information in a hot line table, indicating potential and/or confirmed hot cache lines, to suppress actions associated with operations using cache lines matching entries in the hot line table. In particular, in embodiments, a contention suppression component, or circuit, can embody functions to suppress actions associated with use of cache lines matching entries in a hot line table.

To illustrate CORE 910 further includes a contention suppression circuit, SUPPRESS 928. In embodiments, SUPPRESS 928 can receive inputs to indicate various aspects of cache lines used by CORE 910 (or, PIPELINE 912) in executing instructions. To illustrate, in FIG. 10 SUPPRESS 928 receives inputs MISS 934 and MATCH 936. In embodiments, input MISS 934 can communicate to SUPPRESS 928 that a local cache (e.g., L1 920) incurred a cache line miss, and/or information associated with a missed cache line and/or an instruction that caused a cache line miss. In embodiments input MATCH 936 can communicate information indicating that a cache line (e.g., a cache line subject to a cache line miss) matches an entry in a hot line table (referred to hereinafter as a "matching line"). MATCH 936 can communicate information from a matching hot line table entry, for example that the matching line is only a potential or is a confirmed hot cache line, which instruction and/or operand is associated with the matching line, and/or other attributes of the matching line as it is stored in the table.

Using such inputs, SUPPRESS 928 can communicate to elements of CORE 910 information to cause CORE 910 to suppress operations associated with use of the matching line. For example, example interface 940 can communicate from SUPPRESS 928 to PIPELINE 912 information to cause PIPELINE 912 to suppress execution of instructions, or portions thereof, that use (or, depend on use of) a matching line and/or can cause contention for the matching line with other processors. In embodiment of example system 900, information received by PIPELINE 912 from SUPPRESS 928 can, for example, cause ISSUE 918 to suppress issuing instructions to EXEC 914. In another example, information received by PIPELINE 912 from SUPPRESS 928 can cause LSU 916 to defer fetching a cache line (e.g., a missed cache line corresponding to an entry in HLT 924, or associated with an instruction using a missed cache line corresponding to an entry in HLT 924). Additional examples of such actions include actions those described in reference to operation 808 of method 800, or actions similar to these.

Embodiments are not limited to inputs illustrated in FIG. 10 and/or received from within a processor, and or actions that a contention suppression circuit can take in response to received inputs. For example, in alternative embodiments of a contention suppression circuit can receive inputs from other caches, an SMP network, and/or other processors (either, directly or, alternatively, indirectly, such as through an SMP network connection or routing element). It would be apparent to one of ordinary skill in the art that a contention suppression circuit such as illustrated by SUPPRESSION 928 can receive inputs and/or take a variety of actions intended to avoid transferring, demoting, and/or invalidating, for example, cache lines in contention with other processors, other than as illustrated by the example of FIG. 10.

As previously described, embodiments of a system can take actions relating to hot line status of a cache line, as part of or in conjunction with processing instructions. Using example system 900 of FIG. 10, CORE 910 can perform operations associated with instructions (e.g., submit to various units and/or stages of PIPELINE 912) that use (and/or depend on results of other instructions that use) a matching line included in HLT 924. In conjunction with performing those operations, CORE 910 can perform a method, such as example method 820 of FIG. 9, to modify the matching entry based on the particular operations. For example, as illustrated in method 820, CORE 910 can determine to flush an instruction and, correspondingly, can invalidate an instruction field of a matching line in HLT 924. Alternatively, CORE 910 can complete execution of an instruction and, correspondingly, can reset an entry in HLT 26 corresponding to the matching line. It would be apparent to one of ordinary skill in the art that embodiments can perform a variety of operations to modify attributes of a hot cache line based on operations performed in association with instructions that use a matching line.

Embodiments in which a processor includes both an intervention circuit and a hot line table can have an advantage in, for example, higher degrees of integration of the intervention circuit with the hot line table and/or other components of a processor, such as an instruction pipeline (or, stages or units thereof) and/or a contention suppression unit. Alternative embodiments, in which an intervention circuit is partially, or wholly included in an inter-processor network (or, components thereof) can have an advantage, for example, in higher degrees of integration with components of the network (e.g., cache request/response circuits and/or information associated with cache operations).

The foregoing examples illustrate the disclosure as embodied in a computing system having processors and memory caches to manage cache line transfers and/or related overhead. However, the disclosure is not limited to such embodiments. Computing systems can employ data caches in alternative environments and/or applications, and such alternatives can obtain advantages and/or benefits of the disclosure, such as avoiding or eliminating overhead associated with transferring data between caches.

For example, in a computing system a plurality applications of the computing system (e.g., programs) can share particular data objects. Examples of such applications and systems can include distributed file systems; streaming media systems; World Wide Web ("web") browsers; web hosting applications; social, messaging, and/or email applications; financial applications; home appliance monitoring and/or management systems; and vehicular and/or traffic management systems. In such systems, applications can execute concurrently in a computing system, on the same or different computers, and share particular data (e.g., particular data files and/or metadata; web page content and/or hyperlinks; social, messaging, and/or email data and/or media; and financial, home appliance, and/or vehicle or traffic data).

Applications can make a local, or "cached" copy of particular, shared data (hereinafter, "data object"), such as in a memory, and/or storage medium, of a computer on which the application executes, or in memory and/or storage medium dedicated to an application (e.g., physical and/or virtual memory, or physical and/or virtual storage, associated with an application). Having a copy of a data object in a cache can improve application access latency to the object, in comparison to accessing data object (e.g., the primary, or "master", copy) in, for example, another computer (e.g., a server computer that hosts the application data) or a memory or storage medium in another computer.

Similar to the examples previously described, shared data objects can be subject to contention by multiple applications, which can increase overhead associated with transfer of data objects among various caches of the applications and/or storage having a primary copy of the data object. Accordingly, such systems and/or applications can employ methods and/or structures of the disclosure to reduce, or avoid, overhead associated with fetching a copy of a data object.

Figure 11:
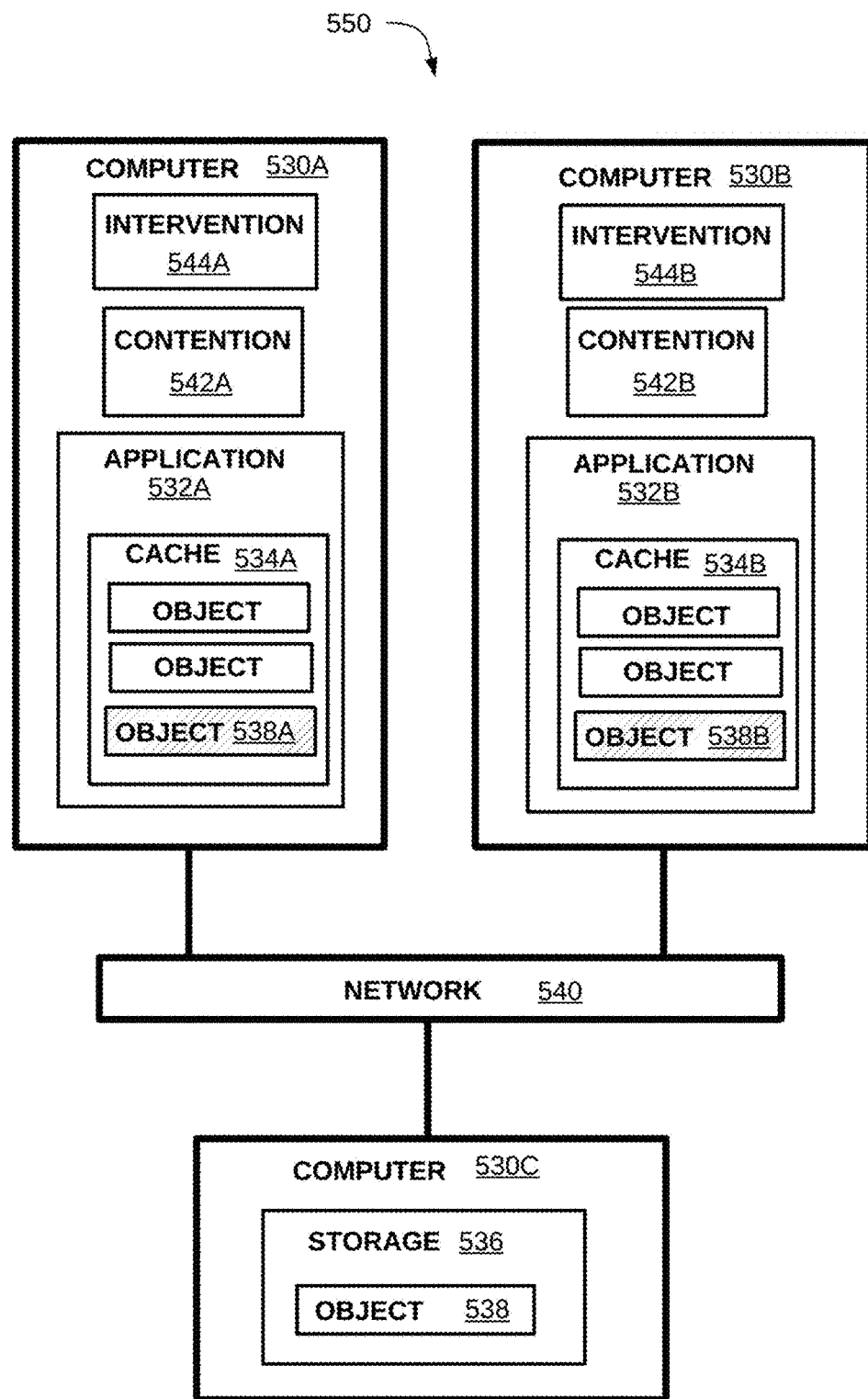
FIG. 11 is a block diagram that illustrates an example system to process a data object, according to aspects of the disclosure.

FIG. 11 illustrates an example embodiment of a system, 550, in which applications can share particular data objects. FIG. 11 illustrates system 550 comprising COMPUTER 530A, 530B, and 530C (hereinafter, "computers 530") interconnected by means of NETWORK 540. In embodiments, computers 530 can be any of a variety of the same or different computers and/or computing devices, such as (but not intended to limit to) a laptop or desktop computer; a server computer; a mobile device; and/or a computer or computing device integrated in or connected to a home appliance, a vehicle, or a traffic system. Embodiments of NETWORK 540 can be, for example, a local area network "LAN", wide area network "WAN", a wireless network, and/or the Internet.

APPLICATION 532A executes on COMPUTER 530A and has (or, is connected to) a local cache, CACHE 534A. Similarly, APPLICATION 532B executes on COMPUTER 530B and has (or, is connected to) a local cache, CACHE 534B. COMPUTER 530C can be a computer that hosts data objects used by (and, shared by) APPLICATIONS 532A and 532B, such as object 538 in STORAGE 536 of COMPUTER 530C. COMPUTER 530C can store a master copy of the data objects. In embodiments, STORAGE 536 can be any of a variety of storage media and/or devices—such as a memory, a disk drive, and/or a storage subsystem—suitable for storing data objects used by applications of computers 530 that operate on the data objects stored therein.

As used herein, and to illustrate the example of FIG. 11, "application" encompasses any application executing on a computer (or, computing device) and components of a computer (or, computing device) (e.g., hardware, firmware, operating systems, middleware and/or other such components of a computer or computing device) which hosts or executes the application. An application, such as 532A, can obtain a copy of a data object, such as OBJECT 538, from COMPUTER 530C and store that copy in a cache, such as OBJECT 538A in CACHE 534A. Subsequently, APPLICATION 532B can request a copy of OBJECT 538.

It would be apparent to one of ordinary skill in the art that, in embodiments, a request by an application for a copy of a shared data object (e.g., a request APPLICATION 532B for a copy of OBJECT 538) can cause conditions to occur with respect to a copy of the object in use by another application (e.g., OBJECT 528A in CACHE 534) similar, or identical, to an intervention, such as previously described. For example, an application can have a copy of a data object with a status of either shared or exclusive. In response to a request by another application to use that data object, an application can demote or invalidate its cached copy of that data object.

It would be further appreciated by one of ordinary skill in the art that an application (e.g., APPLICATION 532) and/or computer (e.g., COMPUTER 530A) or a component thereof, can communicate that intervention to another computer and/or application (e.g., 530B and/or 532B, respectively, and/or COMPUTER 530C) that requested or share the object (e.g., OBJECT 538). For example, in embodiments an application receiving a request to provide a copy of a shared data object can perform a method similar to method 600 of FIG. 6, modified, for example, to substitute a data object (e.g., an identifier of a data object, such as a file name and/or location) for a cache line. In an embodiment, an application can communicate an intervention notification included with a copy of the requested data object, or by other means, such as a message to the requesting application that includes an intervention notification.

As illustrated in FIG. 11, COMPUTERs 530A and 530B include intervention modules shown as INTEVENTION 544A and 544B, respectively. In embodiments, intervention modules can detect, receive, and/or communicate interventions associated with data objects requested by an application and in use by another application, similar to the manner of operation of intervention circuits in the example of system 900 in FIG. 10.

In embodiments, a computer or an application receiving an intervention notification can perform a method similar to method 500 of FIG. 5 in response, and can record a status associated with OBJECT 538 indicating that OBJECT 538 is a potential "hot object". Similarly, in embodiments a computer and/or application receiving a request to provide a copy of OBJECT 538 can perform a method similar to method 700 of FIG. 7 in response, and can record a status associated with OBJECT 538 indicating that OBJECT 538 is a confirmed "hot" data object. In embodiments, an application can use a data object not presently in a local cache and perform a method similar to method 800 of FIG. 8 to determine whether to request a copy, or to suppress actions (e.g., of the application) associated with used the data object, based on whether that data object is associated with a confirmed hot object status.

For example, an embodiment can suppress actions to modify a data object in a local cache, and/or to fetch and/or process other data objects (e.g., an object pointed to by a hot link included in a data modified in a cache of another application and/or a master copy, or a data file associated with metadata contained in a shared data object) related to, or dependent upon, a shared data object, and so forth. Embodiments can include functions to determine to suppress, defer, or terminate an application, or operation of an application, associated with hot data objects. CONTENTION 542A and 542B in FIG. 11 represent modules in a computer that can embody some or all of such functions. It would be appreciated by one of ordinary skill in the art that a variety of application processing actions can be suppressed, deferred, or terminated as an aspect of a method like method 800 (e.g., in operation 808) in accordance with the functions of the application and/or system incorporating that application, and that functions to identify and take such actions can be embodied in a variety of components, and/or arrangements of components within a computer.

Additionally, embodiments of a system such as system 550 can perform a method similar to method 820, of FIG. 9, to modify information recorded to identify, and/or associated with a hot data object. For example, a system can determine if an application has terminated (as similar to determining, in 824, that an instruction is flushed) and can, accordingly, modify attributes of a hot data object in a data structure (such as to invalidate an association of that application with the data object, similar to embodiments of a processor invalidating an instruction field associated with hot a cache line). As another example, a system can determine if an application has completed (similar to determining, in 832, that an instruction has completed) and can, accordingly, reset an entry in a data structure associated with that data object as a hot data object.

It would be apparent to one of ordinary skill how to modify example methods 500, 600, 700, 800, and 820 of FIGS. 5, 6, 7, 8, and 9 to substitute, for example, data objects for cache lines, applications for processors and/or processor instructions, local caches of an application for local caches of a processor, hot line tables with other structures and/or hot line table entries with attributes of data objects in lieu of, or in addition to, attributes of a cache line, and/or updating hot data object structures and/or entries according to various states of an application.

Figure 12:
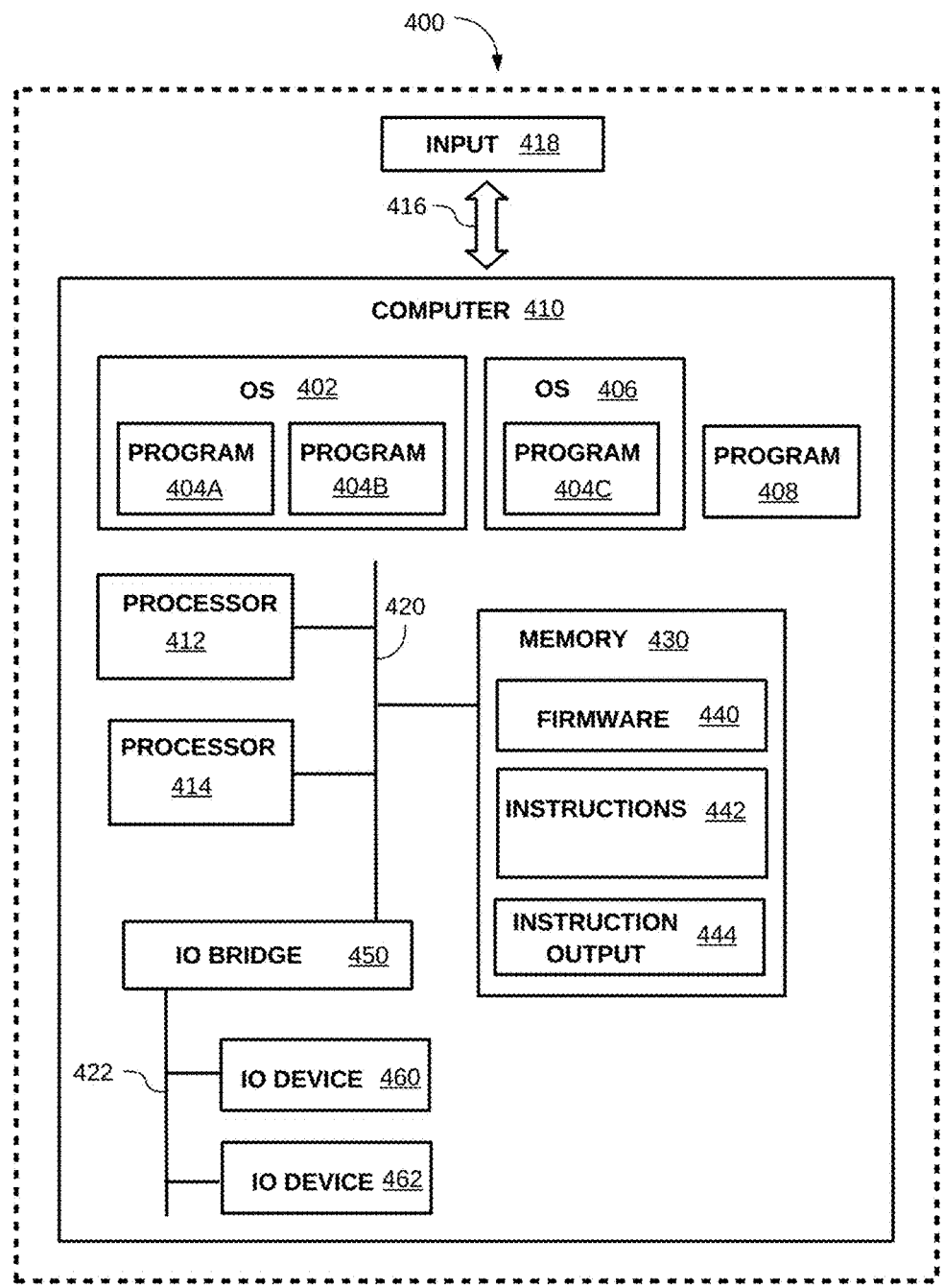
FIG. 12 is a block diagram that illustrates another example computing system to process a cache line and/or data object, according to aspects of the disclosure.

Embodiments of the disclosure can comprise, or can include a computer system, such as illustrated in the example of FIG. 12. As shown in FIG. 12, computer system 400 includes computer 410 having processors 412 and 414. In embodiments, a computer can be a computer such as COMPUTER 530A in FIG. 11, and/or processors can comprise processors such as previously described (e.g., CORE 110 of FIG. 1), a general purpose or a special purpose processor, a co-processor, or any of a variety of processing devices that can execute computing instructions.

FIG. 12 illustrates computer system 400 configured with interface 416 coupling computer 410 to input source 418. In embodiments, interface 416 can enable computer 410 to receive, or otherwise access, 416, input data via, for example, a network (e.g., an intranet, or a public network such as the Internet), or a storage medium, such as a disk drive internal or connected to computer 410. For example, input source 418 can be an SMP network, (e.g., SMP NETWORK 220 in FIG. 2) or another processor, such as illustrated in a core among cores 212 in FIG. 2, and input source 418 can provide requests to fetch a cache line or a data object, and/or an intervention notification, to computer 410, or otherwise enable computer 410 to receive a request to fetch a cache line or data object, to receive a cache line or a data object, and/or to receive an intervention notification, using interface 416.

Interface 416 can be configured to enable human input, or to couple computer 410 to other input devices, such as described later in regard to components of computer 410. It would be apparent to one of ordinary skill in the art that the interface can be any of a variety of interface types or mechanisms suitable for a computer, or a program operating in a computer, to receive or otherwise access or receive a source netlist.

Processors included in computer 410 are connected by a memory interface 420 to memory 430. In embodiments, a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 420, between a processor (or, processors) and a memory (or, memories) can be, for example, a memory bus common to one or more processors and one or more memories. In some embodiments, a memory interface, such as 420, between a processor and a memory can be point to point connection between the processor and the memory, and each processor in the computer can have a point-to-point connection to each of one or more of the memories. In other embodiments, a processor (for example, 412) can be connected to a memory (e.g., memory 430) by means of a connection (not shown) to another processor (e.g., 414) connected to the memory (e.g., 420 from processor 414 to memory 430).

A computer can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 410 includes IO bridge 450 interfacing memory interface 420 to IO devices, such as IO device 460. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices by means of an IO interface, or IO bus, such as IO bus 422 of computer 410. For example, IO bus 422 can be a PCI-Express or other IO bus. IO devices can be any of a variety of peripheral IO devices or IO adapters connecting to peripheral IO devices. For example, IO device 460 can be a graphic card, keyboard or other input device, a hard drive or other storage device, a network interface card, etc. IO device 460 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 12, computer 410 includes a plurality of programs, such as program 408 and program 404. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure. A program can be a program that embodies the methods, or portions thereof, of the disclosure. For example, a program can be a program that executes on a processor of computer 410 to perform one or more methods similar to example methods 500, 600, 700, 800, and/or 820 of FIGS. 5, 6, 7, 8, and 9, respectively, or portions thereof. A program can perform methods similar to these methods modified, as would be understood by one of ordinary skill in the art, suitably for applications sharing data objects in a system such as system 550 of FIG. 11.

Programs can be "stand-alone" programs that execute on processors and use memory within the computer directly, without requiring another program to control their execution or their use of resources of the computer. For example, computer 410 includes stand-alone program 408. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 410 includes operating systems (OSes) 402 and 406, each of which can include, or manage execution of, one or more programs, such as OS 402 including (or, managing) program 404. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 410 includes firmware 440 stored in memory 430. In other embodiments, firmware can be embodied as instructions (e.g., comprising a computer program product) on a storage medium (e.g., a CD ROM, a flash memory, or a disk drive), and the computer can access the instructions from the storage medium.

In embodiments of the present disclosure, a computer can include instructions to perform one or more methods similar to example methods 500, 600, 700, 800, and/or 820 of FIGS. 5, 6, 7, 8, and 9, respectively, or portions thereof. A program can perform methods similar to these methods modified, as would be understood by one of ordinary skill in the art, suitably for applications sharing data objects in a system such as system 550 of FIG. 11. Computer 410 includes, for example, program 404, and program 404 can include instructions 442, which can operate to communicate an intervention notification, and/or to process an intervention and can store, and/or modify, a hot line (or, hot object) table in instruction output 444. The computer can store the instructions and/or the instruction output in a memory of the computer, such as computer 410 storing program instructions 442 and instruction output 444 in memory 430.

The example computer system 400 and computer 410 are not intended to limit embodiments. In embodiments, computer system 400 can include a plurality of processors, interfaces, and <inputs> and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 410 can be, for example, a computing device having a processor capable of executing computing instructions and, optionally, a memory in communication with the processor. For example, computer 410 can be a desktop or laptop computer; a tablet computer, mobile computing device, or cellular phone; or, a server computer, a high-performance computer, or a super computer. Computer 410 can be, for example, a computing device incorporated into a wearable apparatus (e.g., an article of clothing, a wristwatch, or eyeglasses), an appliance (e.g., a refrigerator, or a lighting control), a vehicle and/or traffic monitoring device, a mechanical device, or (for example) a motorized vehicle. It would be apparent to one of ordinary skill in the art that a computer embodying aspects and features of the disclosure can be any of a variety of computing devices having processors and, optionally, memories and/or programs.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems and/or methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over tech-

What is claimed is:

1. A method for managing data object contention in a computing system, the method comprising:
    receiving an intervention notification associated with a first request to obtain a first copy of a first data object, the first request associated with a first computing application, among a plurality of computing applications included in the computing system;
    recording, based at least in part on receiving the intervention notification, a first hot object status indicating that the first data object is a potential hot data object; and
    suppressing, based at least in part on the recorded first hot object status indicating that the first data object is a potential hot data object, an action associated with performing an operation associated with the first data object.

2. The method of claim 1, wherein the intervention notification is further associated with a second computing application, among the plurality of computing applications, having the first copy of the first data object.

3. The method of claim 2, wherein the receiving the intervention notification comprises the second computing application communicating the intervention notification and the first computing application receiving the intervention notification; and
    wherein the suppressing the action comprises the first computing application suppressing the action.

4. The method of claim 2, wherein the first computing application is included in a first computer and the second computing application is included in a second computer communicatively coupled to the first computer.

5. The method of claim 4, wherein the first and second computer are communicatively coupled by a network, and
    wherein the receiving the intervention notification comprises:
        the network receiving the intervention notification from the second computing application,
        the network communicating the intervention notification to the first computing application, and
        the first computing application receiving the intervention notification from the network.

6. The method of claim 1, wherein the method further comprises:
    receiving a second request, associated with a second computing application among the plurality of computing applications, to obtain a second copy of the first data object; and
    recording, in response to receiving the second request, a second hot object status indicating that the first data object is a confirmed hot data object, wherein the recording the second hot object status is based, at least in part, on the recorded first hot object status indicating that the first data object is a potential hot data object; and
    suppressing the action based, at least in part, on the recorded second hot object status indicating that the first data object is a confirmed hot data object.

7. The method of claim 6, wherein the receiving the second request comprises:
    receiving, by a network, the second request from the first computing application,
    communicating, by the network, the second request to the second computing application; and
    the second computing application receiving the second request from the network.

8. The method of claim 1 wherein the operation is associated with the first computing application processing the first data object; and
    wherein the suppressing the action comprises at least one of: suppressing performing the action, deferring performing the action, retrying performing the action, terminating performing the action, suppressing an alternative action associated with the operation, deferring the alternative action, retrying the alternative action, and terminating the alternative action.

9. The method of claim 1, wherein the method further includes a hot object table;
    wherein the hot object table comprises entries associated with respective data objects;
    wherein each entry of the hot object table includes at least one of the first hot object status and a second hot object status, the first hot object status, included in each entry of the hot object table, associated with the respective data object, the second hot object status, included in each entry of the hot object table, indicating that the respective data object is a confirmed hot data object;
    wherein each entry in the hot object table further comprises a respective counter; and
    wherein the method further comprises:
        receiving a request to obtain a copy of second data object;
        determining that the second data object is not included in the hot object table; and,
        in response to determining that the second data object is not included in the hot object table, selecting a matching entry of the hot object table to re-use in association with the second data object, wherein the matching entry corresponds to a third data object different from the second data object, and wherein the selecting the matching entry is based at least in part on the counter included in the matching entry.

10. The method of claim 9, wherein the method further comprises:
    setting the counter, included in a first entry of the hot object table, to an initial value;
    decrementing the counter included in the first entry based, at least in part, on a first set of computing applications, included in the computing system, having not used a data object associated with the first entry within a selected period of time;
    incrementing the counter included in the first entry based on a second computing application, included in the computing system, having used the data object associated with the first entry; and
    selecting the first entry as the matching entry based, at least in part, on the counter included in the first entry having a value less than a value of a respective counter included in an alternative entry of the hot object table.

11. The method of claim 1, further comprising:
    receiving the first request;
    determining that a second computing application, among the plurality of computing applications included in the computing system, has the first copy of the first data object;
    determining that a usage status of the first copy of the first data object comprises an exclusive status;
    generating, based on the first copy of the data object having the exclusive status, the intervention notification; and
    communicating the intervention notification.

12. The method of claim 1, further comprising:
receiving the first request;
determining that the first request is associated with a read-only use of the first data object;
determining that a second computing application, among the plurality of computing applications, has the first copy of the first data object;
determining that a usage status of the first copy of the first data object comprises a shared status; and
communicating, based at least in part on the first request associated with the read-only use of the first copy of the first data object and the first copy of the first data object having the shared status, a notification that the first request did not cause an intervention associated with the first copy of the first data object.

13. A system for managing data object contention, the system comprising:
a first computer, among a plurality of computers included in the system;
a first data object; and
a first computing application, included in the first computer;
wherein the first computer is configured to:
receive an intervention notification associated with a request to obtain a first copy of the first data object and, in response to receiving the intervention notification, to record, a first hot object status, indicating that the first data object is a potential hot data object;
determine an action associated with the first application processing the first data object; and
suppress the action based, at least in part, on the first hot object status indicating the first data object is a potential hot data object.

14. The system of claim 13, wherein the first computer is further configured to:
receive a request to obtain a second copy of the first data object;
record a second hot object status, in response to the request to obtain the second copy and based, at least in part on the first hot object status indicating that the first data object is a potential hot data object, the second hot object status indicating that the first data object is a confirmed hot data object; and
suppress the action based, at least in part, on the second hot object status indicating the first data object is a confirmed hot data object.

15. The system of claim 13, wherein suppressing the action comprises at least one of:
suppressing performing the action, deferring performing the action, retrying performing the action, terminating performing the action, suppressing an alternative action associated with the operation, deferring the alternative action, retrying the alternative action, and terminating the alternative action.

16. The system of claim 13, wherein the system further comprises a hot object table;
wherein the hot object table comprises entries associated with respective data objects;
wherein each entry of the hot object table includes, in association with a respective data object, at least one of the first hot object status and a second hot object status; and
wherein the second hot object status indicates that the respective data object is a confirmed hot data object.

17. The system of claim 16, the system further comprising a second data object, wherein each entry in the hot object table further comprises a respective counter, and wherein the first computer is further configured to:
receive a request to obtain a copy of the second data object;
determine that the second data object is not included in the entries of the hot object table; and,
in response to determining that the second data object is not included in the entries of the hot object table, select a matching entry of the hot object table to re-use in association with the second data object, wherein the matching entry corresponds to a third data object different from the second data object, and wherein selecting the matching entry is based, at least in part, on a value of the counter included in the matching entry.

18. The system of claim 17, wherein the first computer is further configured to:
set a value of the counter, included in a first entry of the hot object table, to an initial value;
decrement the value of the counter included the first entry based, at least in part, on a first set of computing applications, included in the first computer, having not used a data object associated with the first entry within a selected period of time; and
increment the value of the counter included in the matching entry based on a second computing application, included in the first computer, having used the data object associated with the first entry; and
select the first entry as the matching entry based, at least in part, on the value of the counter included in the first entry being less than a value of a respective counter included in a second entry of the hot object table.

19. The system of claim 13, further comprising an intervention module included in the first computer,
wherein the intervention module is configured to receive the intervention notification and, in response, to communicate the intervention notification, to the first computing application; and
wherein the first computing application is further configured to receive the intervention notification from the intervention module.

20. The system of claim 13, wherein the system further comprises a network and a second computer;
wherein the network communicatively couples the first computer to the second computer;
wherein the network is configured to receive the intervention notification from the second computer and to communicate the intervention notification to the first computer; and
wherein the first computer is further configured to receive the intervention notification from the network.

21. The system of claim 20, the system further comprises an intervention module configured to receive the intervention notification and, in response, to communicate the intervention notification, to the first computing application
wherein the intervention module is included in at least one of the first computer, the first computing application, and the network; and
wherein the first computing application is further configured to receive the intervention notification from the intervention module.

22. The system of claim 13, further comprising a second computer, among the plurality of computers included in the system, wherein the second computer is configured to:
receive the first request to obtain the first copy of a first data object;
determine that the second computer includes the first copy of the first data object;

determine that the second computer has the first copy of the first data object with an exclusive status; and generate, in response to receiving the first request and based, at least in part on the exclusive status, the intervention notification; and communicate the intervention notification to the first computer.

23. The system of claim 13, further comprising a second computer, among the plurality of computers included in the system, wherein the second computer is configured to:

receive the first request to obtain the first copy of a first data object;

determine that the second computer includes the first copy of the first data object;

determine that the first request is associated with a read-only use of the first data object;

determine that the second computer has the first copy of the first data object with a shared status; and communicate, based at least in part on the first request associated with the read-only use of the first copy of the first data object and the first copy of the first data object having the shared status, a notification that the first request did not cause an intervention associated with the first copy of the first data object.

24. The system of claim 22, further comprising a network and a second computer;

wherein the network communicatively couples the first computer to the second computer;

wherein the network is configured to receive the intervention notification from the second computer and to communicate the intervention notification to the first computer; and wherein the first computer is further configured to receive the intervention notification from the network.

25. The system of claim 24, further comprising an intervention module included in at least one of the second computer and the network, wherein the intervention module is configured to:

determine that the second computer has the first copy of the first data object with a shared status; and communicate the notification that the first request did not cause an intervention associated with the first copy of the first data object.

* * * * *